(12) United States Patent
Moura et al.

(10) Patent No.: US 10,240,405 B2
(45) Date of Patent: Mar. 26, 2019

(54) FLUID FLOW CONTROL SYSTEMS AND METHODS

(71) Applicant: ONESUBSEA IP UK LIMITED, London (GB)

(72) Inventors: Joao Carlos de Alencar Moura, Houston, TX (US); Eoghan Oisin O'Neill, Houston, TX (US); Tyler Erwin Skowronek, Cypress, TX (US); Charles Brown, Houston, TX (US)

(73) Assignee: OneSubsea IP UK Limited (GB)

( * ) Notice: Subject to any disclaimer, the term of this patent is extended or adjusted under 35 U.S.C. 154(b) by 134 days.

(21) Appl. No.: 15/338,053

(22) Filed: Oct. 28, 2016

(65) Prior Publication Data
US 2018/0119516 A1    May 3, 2018

(51) Int. Cl.

| | |
|---|---|
| E21B 17/18 | (2006.01) |
| E21B 34/04 | (2006.01) |
| E21B 34/02 | (2006.01) |
| E21B 34/10 | (2006.01) |
| E21B 43/14 | (2006.01) |
| E21B 43/12 | (2006.01) |
| F16K 31/122 | (2006.01) |
| F16K 31/44 | (2006.01) |
| F16K 11/085 | (2006.01) |
| E21B 34/00 | (2006.01) |

(52) U.S. Cl.
CPC .............. *E21B 17/18* (2013.01); *E21B 34/02* (2013.01); *E21B 34/04* (2013.01); *E21B 43/12* (2013.01); *F16K 11/0853* (2013.01); *F16K 31/1221* (2013.01); *F16K 31/1223* (2013.01); *F16K 31/445* (2013.01); *E21B 2034/002* (2013.01)

(58) Field of Classification Search
CPC .......... E21B 34/04; E21B 34/02; E21B 34/10; E21B 43/017; E21B 43/14
USPC ....................................... 166/97.1
See application file for complete search history.

(56) References Cited

U.S. PATENT DOCUMENTS

| 3,236,255 A * | 2/1966 | Sizer ..................... E21B 34/08 137/494 |
|---|---|---|
| 2002/0000315 A1* | 1/2002 | Kent ...................... B24B 37/04 166/85.4 |
| 2008/0053660 A1* | 3/2008 | Angman ................. E21B 19/06 166/373 |

(Continued)

*Primary Examiner* — Cathleen R Hutchins
(74) *Attorney, Agent, or Firm* — Conley Rose, P.C.

(57) ABSTRACT

A fluid flow control assembly includes a first pipe-in-pipe assembly comprising an inner tubular member disposed in an outer tubular member, wherein the inner tubular member comprises an inner bore and an annulus is formed between the inner tubular member and the outer tubular member, a terminating bulkhead assembly coupled to the first pipe-in-pipe assembly, wherein fluid communication is provided between a bore of the bulkhead assembly and the inner bore of the inner tubular member while fluid communication is restricted between the bore of the bulkhead assembly and the annulus of the first pipe-in-pipe assembly, and an annulus conduit coupled to a radial port of the first pipe-in-pipe assembly, wherein fluid communication is provided between the annulus conduit and the annulus of the first pipe-in-pipe assembly while fluid communication is restricted between the annulus conduit and the inner bore of the inner tubular member.

21 Claims, 16 Drawing Sheets

(56) References Cited

U.S. PATENT DOCUMENTS

2008/0229774 A1* 9/2008 Jeffers ................ B60H 1/00585
62/292

* cited by examiner

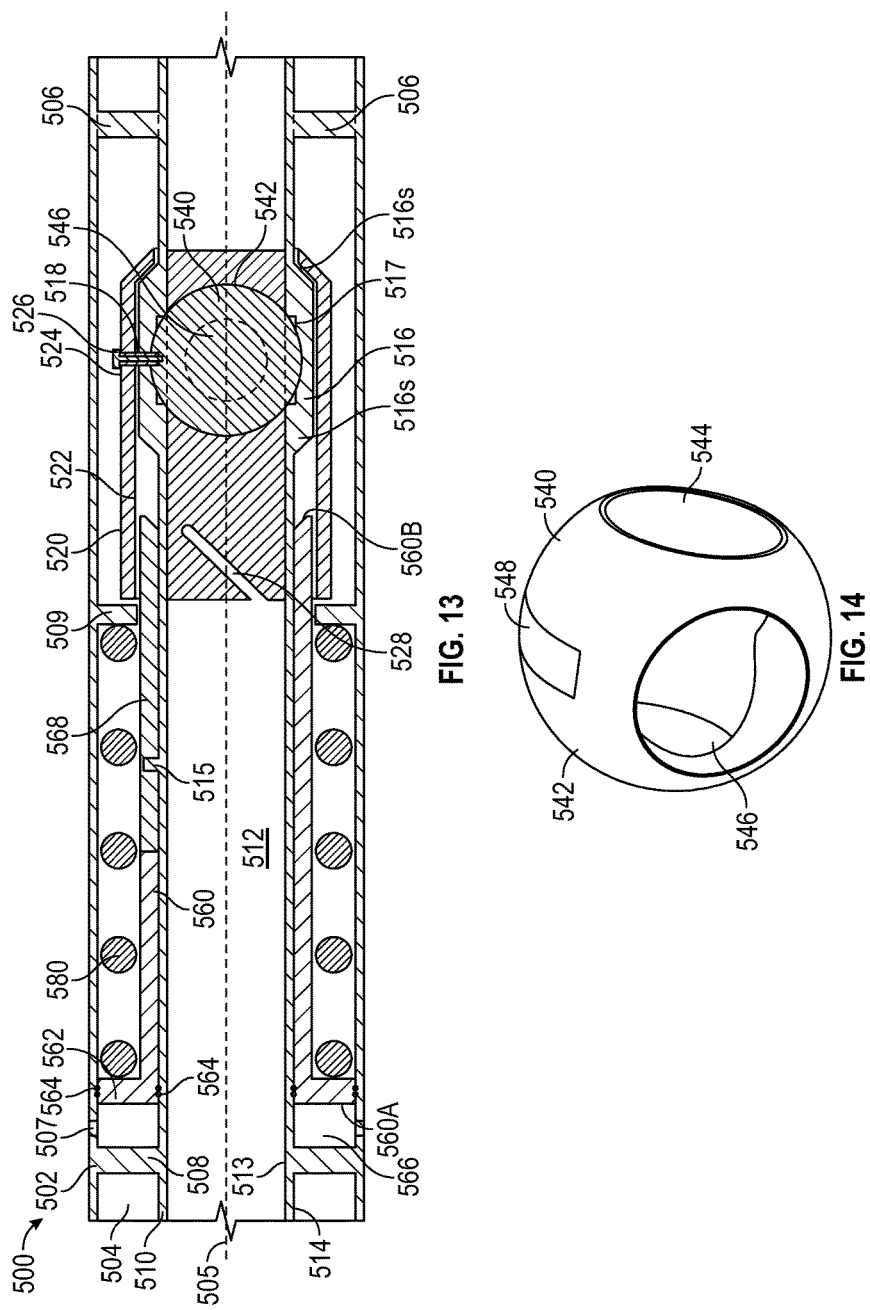

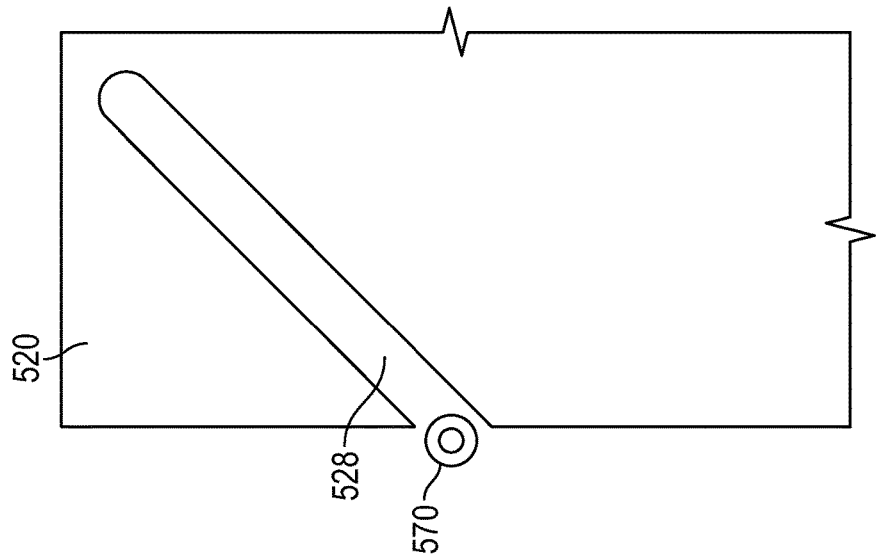
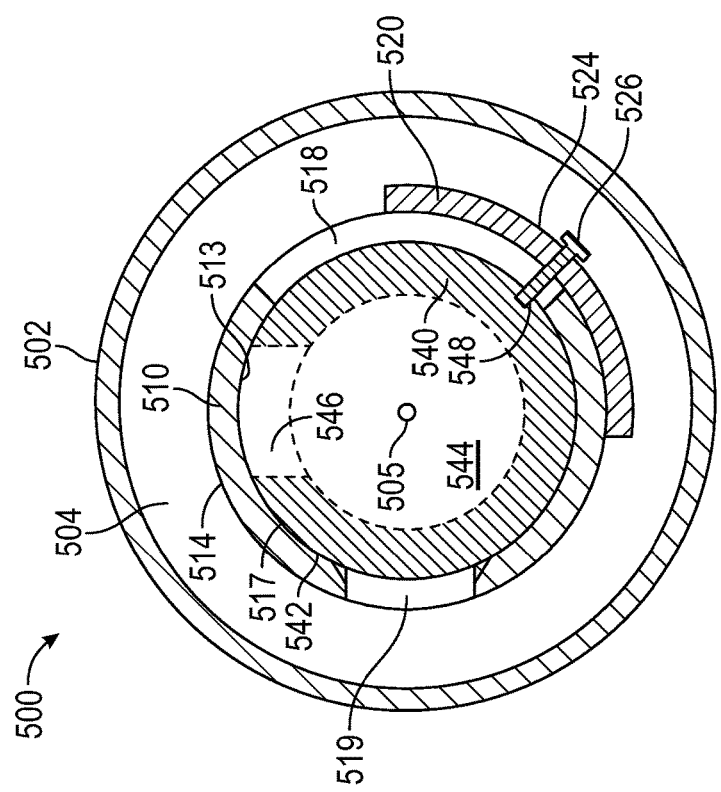

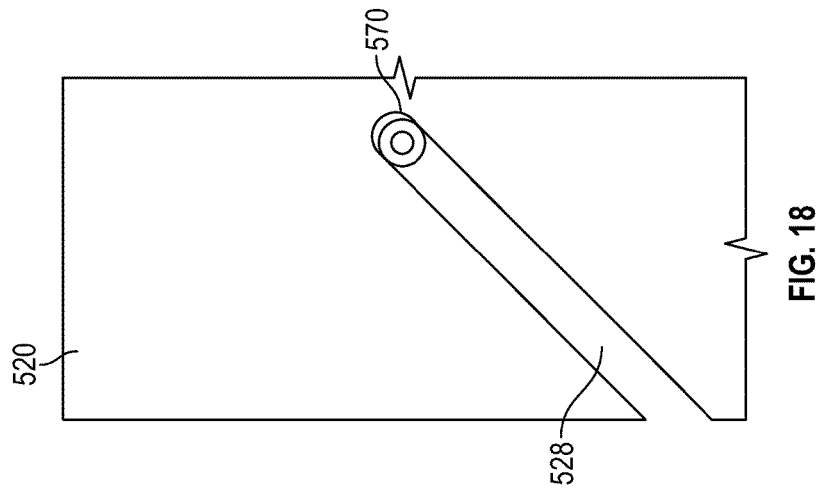
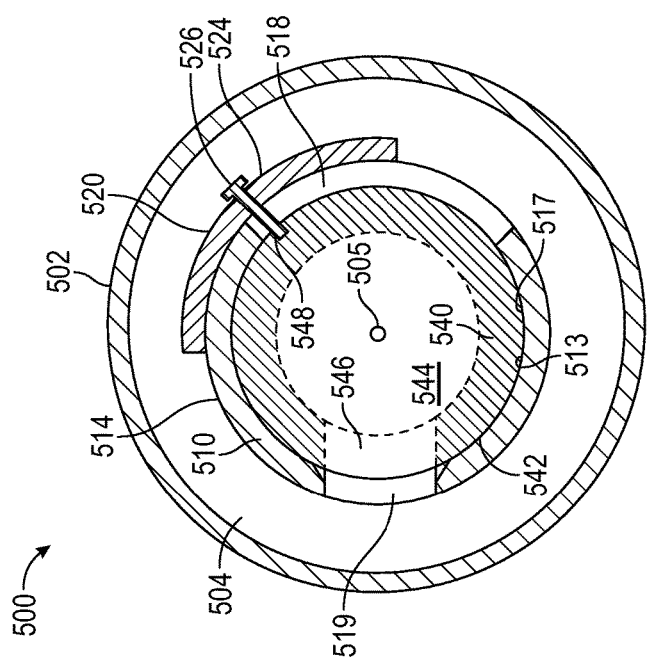

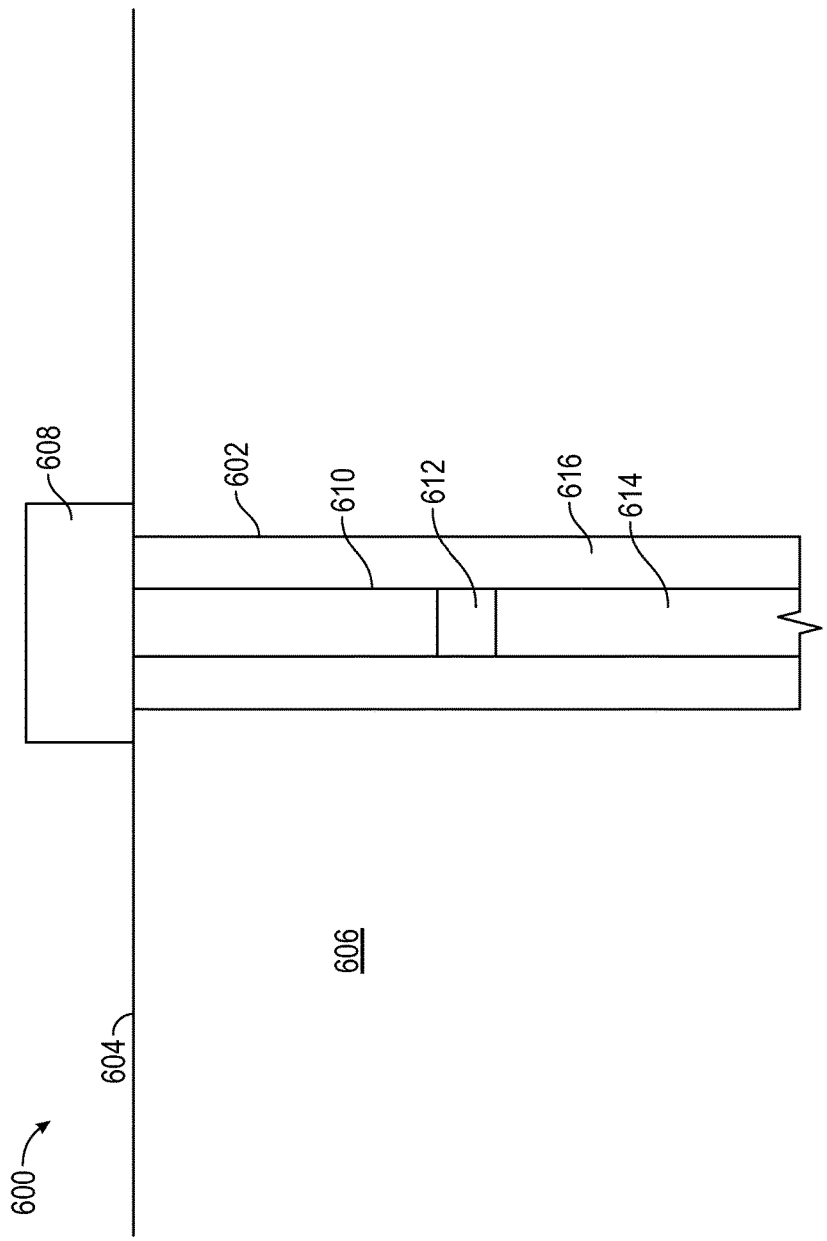

FLUID FLOW CONTROL SYSTEMS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This section is intended to provide background information to facilitate a better understanding of the various aspects of the presently described embodiments. Accordingly, it should be understood that these statements are to be read in this light, and not as admissions of prior art.

Hydrocarbon drilling and production systems may comprise multiple fluid conduits with an inner fluid conduit or flowline positioned concentrically within an outer fluid conduit or flowline, thereby forming an annulus between the inner and outer fluid conduits. For instance, in hydrocarbon drilling systems an annulus may be formed between a work string or tubing positioned within a borehole and a casing string that lines the outer surface of the borehole. In another example, some offshore hydrocarbon production systems include pipe-in-pipe systems for transporting a first fluid (e.g., recovered hydrocarbons, etc.) within a bore of an inner fluid conduit. In this example, the annulus formed around an exterior surface of the inner fluid conduit may contain a second fluid, such as an insulating fluid for heating the first fluid disposed in the bore of the inner fluid conduit. In some applications, it may be desirable to provide for selective fluid communication between the bore of the inner fluid conduit and the annulus. For instance, in some applications a blockage may form in the bore of the inner fluid conduit, necessitating the provision of fluid communication between the bore of the inner fluid conduit and the annulus to pass a fluid around the blockage disposed in the inner fluid conduit.

BRIEF DESCRIPTION OF THE DRAWINGS

Non-limiting embodiments of fluid flow control systems and methods are further described in the following detailed description with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIG. 13 is a side cross-sectional view of a ball valve assembly shown in a first position in accordance with one or more embodiments of the present disclosure;

FIG. 14 is a perspective view of a ball member of the ball valve assembly of FIG. 13 in accordance with one or more embodiments of the present disclosure;

FIG. 15 is a front cross-sectional view of the ball valve assembly of FIG. 13 shown in the first position in accordance with one or more embodiments of the present disclosure;

FIG. 16 is a top view of an embodiment of a rotation sleeve of the ball valve assembly of FIG. 13, where the ball valve assembly of FIG. 13 is shown in the first position in accordance with one or more embodiments of the present disclosure;

FIG. 17 is a front cross-sectional view of the ball valve assembly of FIG. 13 shown in a second position in accordance with one or more embodiments of the present disclosure;

FIG. 18 is a top view of the rotation sleeve of the ball valve assembly of FIG. 13, where the ball valve assembly of FIG. 13 is shown in the second position in accordance with one or more embodiments of the present disclosure; and FIG. 19 is a schematic view of a well system in accordance with one or more embodiments of the present disclosure.

DETAILED DESCRIPTION

Figure 1:
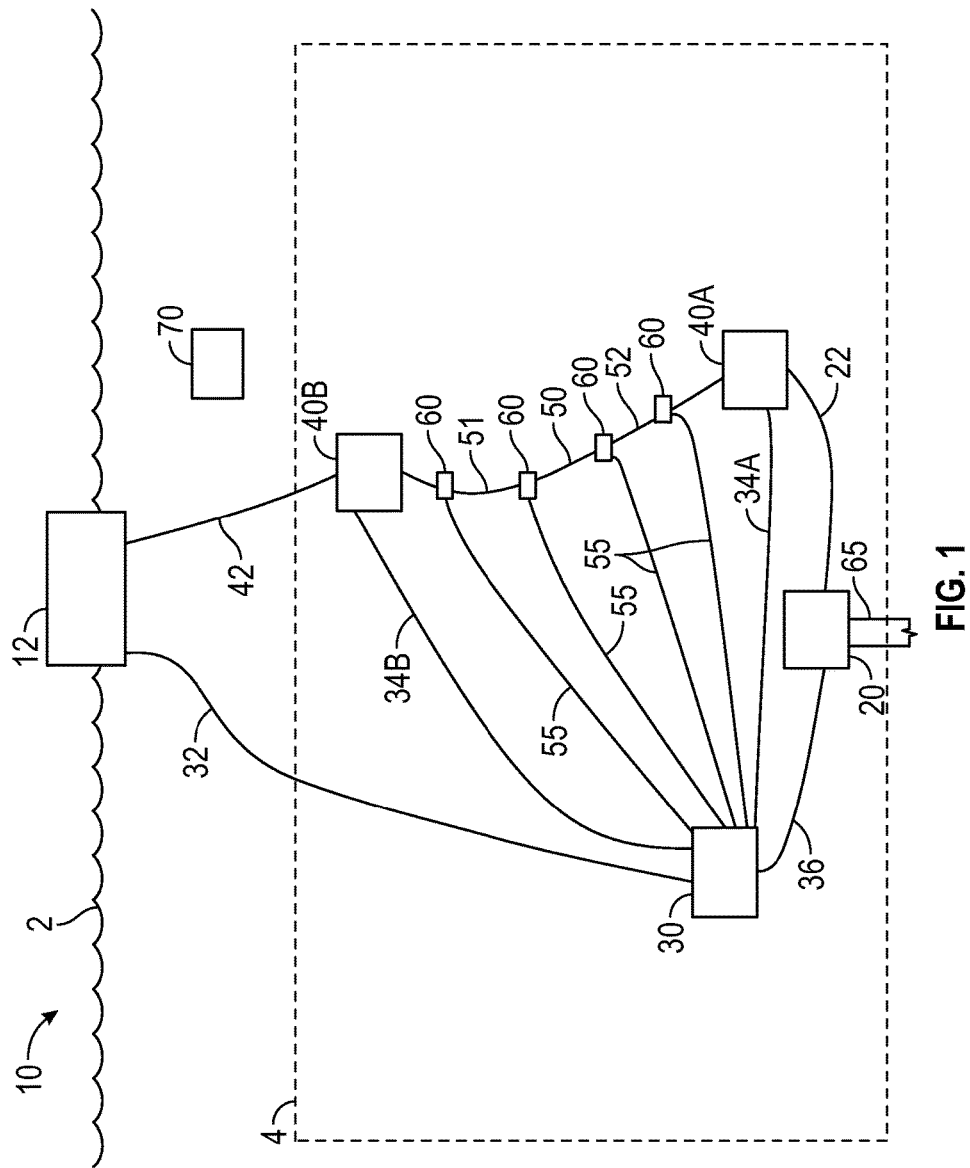
FIG. 1 is a schematic view of an offshore hydrocarbon production system in accordance with one or more embodiments of the present disclosure.

The present disclosure is susceptible to embodiments of different forms. Specific embodiments are described in detail below and are shown in the drawings, with the understanding that the present disclosure is to be considered an exemplification of the principles of the disclosure, and is not intended to limit the disclosure to that illustrated and described herein. In an effort to provide a concise description of these specific embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure. It is to be fully recognized that the different teachings of the embodiments discussed below may be employed separately or in any suitable combination to produce desired results.

Unless otherwise specified, in the following discussion and in the claims, the articles "a," "an," and "the" are intended to mean that there are one or more of the elements. The terms "including," "comprising," "having," and variations thereof are used in an open-ended fashion, and thus should be interpreted to mean "including, but not limited to . . . ." Any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience but does not require any particular orientation of the components.

Certain terms are used throughout the following description and claims to refer to particular features or components. As one skilled in the art will appreciate, different persons may refer to the same feature or component by different names. This document does not intend to distinguish between components or features that differ in name but not function. The various features and characteristics of the present disclosure will be readily apparent to those skilled in the art upon reading the following detailed description of embodiments with reference to the accompanying drawings.

Referring to FIG. 1, a schematic of a well system 10. In the embodiment shown in FIG. 1, well system 10 comprises a subsea or offshore production system 10; however, in other embodiments, well system 10 may comprise other well systems, including injection systems. In still other embodiments, well system 10 may comprise a surface well system. The production system 10 generally includes a surface platform 12, a wellhead 20, an umbilical terminal assembly (UTA) 30, a plurality of pipeline end terminations (PLETs) 40 (shown in FIG. 1 as two PLETs 40A and 40B for clarity but comprising two or more, for example three, four, five, or more PLETs, and a plurality of fluid flow control assemblies 60 of the present disclosure. In other embodiments, well system 10 may include pipeline end manifolds (PLEMs) in conjunction with or in lieu of PLETs 40. A remotely operated underwater vehicle (ROV) 70 may be used, for example during certain intervention or other operations. Surface platform 12 is disposed at or near the sea surface or waterline 2. In FIG. 1 surface platform 12 is depicted as a semi-submersible production platform; however, in other embodiments, surface platform 12 may be any of a variety of other vessels or platforms known in the art. In the schematic of FIG. 1, wellhead 20, UTA 30, and PLETs 40A and 40B are disposed at or near the sea floor 4 or mudline, vertically spaced from distal surface platform 12.

In the embodiment shown in FIG. 1, pressurized fluids, electrical power, and/or communications are provided to the components of production system 10 disposed at or near the sea floor 4 via an umbilical 32 that extends between surface platform 12 and UTA 30. UTA 30 is configured to route selected fluids, power, and/or communications provided by umbilical 32 to the appropriate components of production system 10 disposed at or near the sea floor 4. In the embodiment shown in FIG. 1, UTA 30 is connected to a first PLET 40A via a first jumper or flying lead 34A and to a second PLET 40B via a second jumper or flying lead 34B, while UTA 30 connects to wellhead 20 (e.g., via a subsea tree), via a third jumper or flying lead 36. Jumpers 34A, 34B, and 36 may each provide fluid, power, and/or communications connections between UTA 30 and first PLET 40A and second PLET 40B and wellhead 20 (e.g., via a subsea tree), respectively.

In embodiments, and as shown in FIG. 1, wellhead 20 is disposed above a well or wellbore 65 extending into a subterranean earthen formation below the sea floor or mudline 4, and is configured to provide hydrocarbons from the wellbore 65 to PLET(s) 40 via a fluid flowline or jumper 22 extending therebetween. First PLET 40A is configured to receive hydrocarbons from wellhead 20 and route the hydrocarbons to a second PLET 40B via a production flowline 50 extending therebetween. In the embodiment shown in FIG. 1, production flowline 50 comprises a pipe-in-pipe conduit or system including a first or inner conduit or flowline 51 disposed within a second or outer conduit or flowline 52. Second PLET 40B is configured to supply surface platform 12 with extracted hydrocarbons via a marine riser 42 extending vertically from second PLET 40B disposed at or near the sea floor 4 to the surface platform 12 disposed at the waterline 2. In the embodiment shown in FIG. 1, riser 42 comprises a single riser; however, in other embodiments, rise 42 may comprise a pipe-in-pipe riser system.

In the configuration illustrated in FIG. 1, a first fluid disposed in the bore of the inner flowline 51 may be routed from the first PLET 40A to the second PLET 40B while a second fluid disposed in the annulus extending radially between the inner flowline 51 and outer flowline 52 may be routed from the second PLET 40B, or from an external source such as an umbilical 32 or ROV 70, to the first PLET 40A. Alternatively, the annulus of production flowline 50 may be utilized in a variety of ways, including as a route for production fluids to circumvent blockages formed in the bore of the inner flowline 51, or as a space for the subsea injection of chemicals into production system 10. Additionally, the inner flowline 51 of pipe-in-pipe production flowline 50 is piggable to remove blockages while allowing fluid communication through the surrounding annulus.

In order to fully utilize the functionality provided by pipe-in-pipe production conduit 50, conduit 50 includes a plurality of the flow control assemblies 60 of the present disclosure, where each assembly 60 is generally configured to provide for selective fluid communication between the bore of the inner flowline 51, the annulus disposed between the inner flowline 51 and the outer flowline 52, and an external source. In some embodiments, each flow control assembly 60 may be used to selectively isolate or seal the bore of the inner flowline 51 and/or the annulus of production conduit 50 at predetermined locations disposed along conduit 50. Moreover, flow control assemblies 60 may be used to inject external fluids into production conduit 50 at predetermined locations along conduit 50. In the embodiment shown in FIG. 1, ROV 70 may be used to operate various components of hydrocarbon production system 10, including embodiments of flow control assembly 60 as will be discussed further herein. In some embodiments, ROV 70 may include a separate umbilical (not shown) extending from surface platform 12 for providing power and communications to ROV 70. In the embodiment shown in FIG. 1, fluid, power, and/or communications are provided to flow control assemblies 60 via a plurality of flow control jumpers or flying leads 55, where each flow control jumper 55 extends between UTA 30 and a corresponding flow control assembly 60. Flow control assemblies 60 may be mechanically, hydraulically, or electrically actuated to provide for selective fluid communication between the bore of the inner flowline 51, the annulus disposed between the inner flowline 51 and outer flowline 52, and an external source.

Although FIG. 1 illustrates only production conduit 50 as including flow control assemblies 60, in other embodiments, hydrocarbon production system 10 may include other pipe-in-pipe fluid conduits comprising one or more flow control assemblies 60. Additionally, although flow control assemblies 60 are shown in FIG. 1 as associated with or comprising a component of an offshore production system 10, in other embodiments, a flow control assembly 60 may be associated with or comprise a component of an on-shore or surface production or injection system. In still further embodiments, flow control assembly 60 may be used in varying industrial applications including pipe-in-pipe systems or any system comprising a tubular member surrounded by an annulus.

Referring to FIGS. 2-6, embodiments of a flow control assembly 60 of FIG. 1 is shown. Flow control assembly 100 shown in FIGS. 2-6 may be used in the production system 10 described above, as well as in other well systems or industrial applications. Flow control assembly 100 is configured to provide for selective fluid communication between an inner bore and an annulus of a pipe-in-pipe system, and an external source. In the embodiments illustrated in FIGS. 2-6, flow control assembly 100 generally includes a support frame 102, a pair of pipe-in-pipe assemblies 120A and 120B, a terminating bulkhead assembly 140, an annulus conduit 160, a crossover conduit 180, and an external communication conduit 192. In some embodiments, the external communication conduit 192 comprises an injection conduit 192. Support frame 102 of flow control assembly 100 is configured to physically support components of assembly 100 and receive loads applied to assembly 100 from the pipe-in-pipe system coupled therewith (e.g., production conduit 50 of FIG. 1, etc.).

Figure 2:
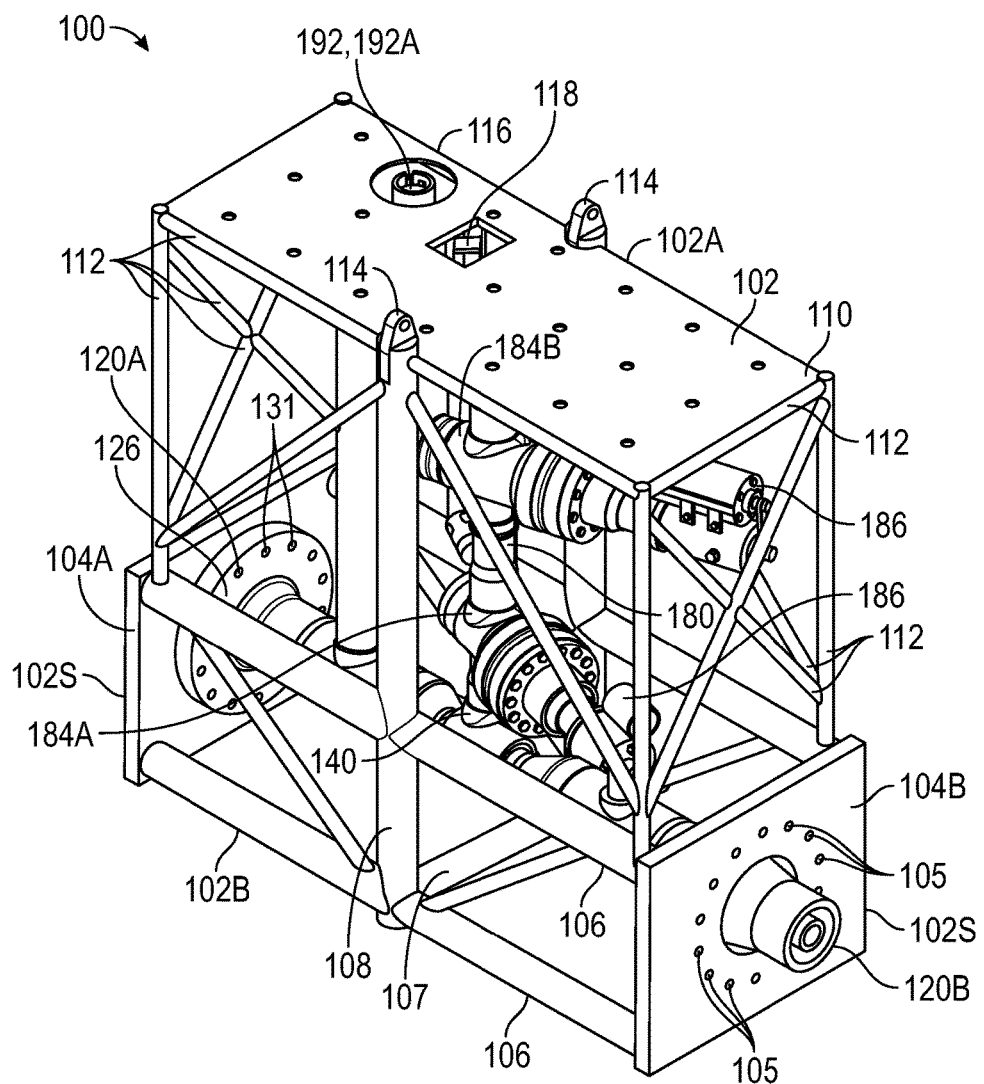
FIG. 2 is a perspective view of a fluid flow control assembly in accordance with one or more embodiments of the present disclosure.

In the embodiment shown in FIG. 2, support frame 102 of flow control assembly 100 has a first or upper end 102A, a second or lower end 102B, and a pair of lateral ends or sides 102S. Support frame 102 generally includes a pair of lateral support panels 104A and 104B disposed at the lateral sides 102S of support frame 102, a plurality of laterally extending support members 106 that extend between lateral sides 102S, a cross-brace member 107, a plurality of vertically or longitudinally extending support members 108 that extend between the upper end 102A and lower end 102B of support frame 102, an upper support panel 110 disposed at the upper end 102A of support frame 102, and a plurality of additional support members 112. In this embodiment, each lateral support panel 104A and 104B couples with a corresponding pipe-in-pipe assembly 120A and 120B, respectively, via a plurality of fasteners 105 extending through corresponding apertures disposed in lateral support panels 104A and 104B. Lateral support panels 104A and 104B are configured to receive loads applied to pipe-in-pipe assemblies 120A and 120B via the fasteners 105 from the pipe-in-pipe system coupled therewith.

In the embodiment shown in FIG. 2, lateral support members 106 of support frame 102 comprise structural members and extend between and couple with lateral support panels 104A and 104B and are configured to receive loads transferred to lateral support members 104A and 104B from pipe-in-pipe assemblies 120A and 120B. In some embodiments, the support frame 102 may include a combination of tubular members, beams, channels, square tubulars, or other common structural components to accomplish the same or a similar purpose as described. In this manner, lateral support members 106, as well as other components of support frame 102, are configured to increase the strength and structural integrity of flow control assembly 100 by absorbing loads applied to pipe-in-pipe assemblies 120A and 120B from the pipe-in-pipe system coupled therewith, thereby reducing the amount of stress applied to pipe-in-pipe assemblies 120A and 120B. Cross-brace member 107 or the like extends between a pair of parallel extending lateral support members 106 for providing additional structural integrity to support frame 102. Vertical support members 108 of support frame 102 comprise structural members and couple with lateral support members 106 for distributing applied loads throughout support frame 102. An upper terminal end of each vertical support member 108 couples with upper support panel 110, where upper support panel 110 generally includes a flat or planar panel and a plurality of support members 112. Additionally, the upper terminal end of each vertical support member 108 may include a lifting eye 114 for onshore handling.

In the embodiment shown in FIG. 2, upper support panel 110 additionally includes an injection port aperture 116 and a subsea connector or interface 118, as will be described further herein. Subsea connector 118 is generally configured to provide an interface between an external tool, such as ROV 70, and a flow control assembly 100 of the present disclosure. In this embodiment, subsea connector 118 may include an ROV intervention bucket for interfacing with a torque tool of ROV 70 to allow ROV 70 to apply torque to components of the flow control assembly 100. However, in other embodiments, subsea connector 118 may include a hydraulic stab plate connector; in still other embodiments, subsea connector 118 may include varying subsea or wet connectors known in the art. Further, in the embodiment shown in FIG. 2, the additional support members 112 comprise structural or tubular members extending between and coupled with lateral support members 106, vertical support member 108, and/or other support members 112 for providing additional structural integrity to support frame 102. However, in other embodiments, various other configurations of support members may be used in support frame 102.

Pipe-in-pipe assemblies 120A and 120B of flow control assembly 100 are each configured to provide a pipe-in-pipe fluid connection to a pipe-in-pipe system coupled to flow control assembly 100. In the embodiments shown particularly in FIGS. 3, 5 and 6, each pipe-in-pipe assembly 120A and 120B of flow control assembly 100 generally includes an anchor flange member 122 and a tee member 130 coupled to an end of the anchor flange member 122. Particularly, the anchor flange member 122 of each pipe-in-pipe assembly 120A and 120B has a first or outer end 122A and a second or inner end 122B (shown in FIGS. 5 and 6), where the outer end 122A of each anchor flange 122 comprises a first or outer end of each pipe-in-pipe assembly 120A and 120B.

Each anchor flange 122 of flow control assembly 100 includes a first or outer tubular member 124 and a second or inner tubular member 128 disposed within outer tubular member 124. In some embodiments, anchor flanges 122 may comprise stand-alone connections to outer tubular member 124 with no direct connection with inner tubular member 128.

Specifically, the outer tubular member 124 of each anchor flange 122 comprises a centrally disposed bore 125 defined by a generally cylindrical inner surface of outer tubular member 124. Inner tubular member 128 is disposed in the bore 125 of outer tubular member 124 and includes a centrally disposed inner bore 129 defined by a generally cylindrical inner surface of inner tubular member 128. In the embodiments shown in FIGS. 2-6, the inner tubular member 128 of each anchor flange 122 is coupled to outer tubular member 124 via a connecting flange that extends radially between an outer cylindrical surface of inner tubular member 128 and the inner surface of outer tubular member 124. A plurality of circumferentially spaced apertures 128a (FIGS. 5 and 6) are formed in the connecting flange of each anchor flange 122 to permit fluid flow through an annulus 127 formed between the outer surface of inner tubular member 128 and the inner surface of outer tubular member 124. In the embodiments shown in FIGS. 2-6, inner tubular member 128 is disposed concentrically within the bore 125 of outer tubular member 124; however, in other embodiments, a longitudinal axis of inner tubular member 128 may be offset from a longitudinal axis of outer tubular member 124.

In the embodiments shown in FIGS. 2-6, a generally cylindrical outer surface of the outer tubular member 124 of each anchor flange 122 includes a radially outwards extending connecting flange 126. A plurality of circumferentially spaced apertures 131 are formed in each connecting flange 126 for receiving the fasteners 105 of support frame 102 to couple each anchor flange 122 with support frame 102. In this arrangement, loads applied to each anchor flange 122 from a pipe-in-pipe system coupled thereto are transferred to support frame 102 via the physical connection formed between each connecting flange 126 and a corresponding lateral support panel 104A and 104B of support frame 102. The outer end 122A of each anchor flange 122 is coupled (e.g., via an additional flange not shown in FIGS. 2-6, or through other mechanisms, e.g., welding, known in the art) to a terminal end of a pipe-in-pipe system, such as production conduit 50 shown in FIG. 1. In the embodiments shown in FIGS. 3, 5, and 6, a first or outer end of outer tubular member 124 defines the distal or outer end 122A of each anchor flange 122, while a proximal or inner end of inner tubular member 128 defines the inner end 122B of each anchor flange 122. In other words, the inner end of inner tubular member 128 extends axially from a second or inner end of outer tubular member 124. However, in other embodiments, outer tubular member 128 may not extend from the bore 125 of inner tubular member 124 as shown particularly in FIGS. 5 and 6.

Tee members 130 of flow control assembly 100 are configured to route fluid from the annulus 127 of anchor flanges 122 to annulus conduit 160. In the embodiments shown in FIGS. 2-6, each tee member 130 of a flow control assembly 100 includes a first or outer end 130A, a second or inner end 130B, and a centrally disposed bore 132 extending between ends 130A and 130B where bore 132 is defined by a generally cylindrical inner surface of tee 130. In embodiments, the outer end 130A of each tee 130 is coupled with the inner end of the outer tubular member 124 of a corresponding anchor flange 122, while inner end 130B is coupled to a terminal end of terminating bulkhead assembly 140. Particularly, in the illustrated embodiment, terminating bulkhead assembly 140 generally includes a bulkhead tee member 143 between a pair of terminating bulkhead members 141, where inner end 130B couples with a corresponding bulkhead member 141. In other embodiments, terminating bulkhead assembly 140 may comprise a single unitary member instead of the separate bulkhead members 141 and bulkhead tee 143. Each tee member 130 additionally may include a radial port 134 that extends radially from an outer cylindrical surface of tee member 130 and provides for fluid communication between bore 132 and annulus conduit 160. As shown particularly in FIGS. 5 and 6, the inner end of the inner tubular member 128 of an adjacent anchor flange 122 of flow control assembly 100 extends through bore 132 of tee 130 to provide fluid communication between inner bore 129 of inner tubular member 128 and terminating bulkhead assembly 140 while restricting fluid communication between inner bore 129 and an annulus formed in bore 132 of tee 130 between the outer surface of inner tubular member 128 and the inner surface of tee 130. In this manner, annulus 127 also extends through bore 132 of tee 130, where annulus 127 is disposed radially between the outer surface of the inner tubular member 128 of anchor flange 122 and the inner surface of tee 130.

The terminating bulkhead assembly 140 of flow control assembly 100 may be configured to provide fluid communication between the inner bore 129 of the inner tubular member 128 of each anchor flange 122 of flow control assembly 100. In the embodiments shown in FIGS. 2-6, terminating bulkhead assembly 140 generally includes a first end 140A, a second end 140B, a central bore 142 extending between ends 140A and 140B, bulkhead members 141, bulkhead tee 143, a pair of opposed outer tubular member terminations 144, a pair of opposed inner tubular member terminations 146, and a radial port 148 that extends radially outwards from an outer cylindrical surface of the bulkhead tee 143 of terminating bulkhead assembly 140. In embodiments, bulkhead members 141 of bulkhead assembly 140 each include an outer tubular member termination 144 and an inner tubular member termination 146. As shown particularly in FIGS. 5 and 6, a first outer tubular termination 144 couples with the inner end 130B of the tee 130 of pipe-in-pipe assembly 120A at first end 140A, while a second outer tubular termination 144 couples with the inner end 130B of the tee 130 of pipe-in-pipe assembly 120B at second end 140B.

Further, a first inner tubular termination 146 couples with the inner end of the inner tubular member 128 of the anchor flange 122, or an intermediary inner pipe component, of pipe-in-pipe assembly 120A at first end 140A/inner end 122B of anchor flange 122, while a second inner tubular termination 146 couples with the inner end of the inner tubular member 128 of the anchor flange 122 of pipe-in-pipe assembly 120A at second end 140B/inner end 122B of anchor flange 122. In this arrangement, fluid communication is provided between the inner bore 129 of the inner tubular member 128 of anchor flange 122 of pipe-in-pipe assemblies 120A and 120B via bore 142 of terminating bulkhead assembly 140 while restricting fluid communication between the annulus 127 of pipe-in-pipe assembly 120A and the annulus 127 of pipe-in-pipe assembly 120B. Additionally, fluid communication is provided between bore 142 of terminating bulkhead assembly 140 and crossover conduit 180 via radial port 148.

Annulus conduit 160 of flow control assembly 100 comprises a generally tubular member and is configured to provide fluid communication between the annulus 127 formed in pipe-in-pipe assembly 120A and the annulus 127 formed in pipe-in-pipe assembly 120B. In the embodiment shown in FIGS. 2-6, annulus conduit 160 generally includes a first end 160A, a second end 160B, a central bore 162 extending between ends 160A and 160B, and a tee member 164 disposed between ends 160A and 160B. The first end 160A of annulus conduit 160 couples with the radial port 134 of the tee 130 of pipe-in-pipe assembly 120A while the second end 160B couples with the radial port 134 of the tee 130 of pipe-in-pipe assembly 120B. As shown particularly in FIGS. 5 and 6, tee 164 of annulus conduit 160 includes a radial port 166 in fluid communication with crossover conduit 180. In this arrangement, a first segment 162A of bore 162 extends between first end 160A and tee 164 while a second segment 162B of bore 162 extends between tee 164 and second end 160B.

Crossover conduit 180 of flow control assembly 100 is configured to provide for selective fluid communication between annulus conduit 160 and terminating bulkhead assembly 140. In the embodiments shown in FIGS. 2-6, crossover conduit 180 generally includes a first end 180A coupled with port 148 of terminating bulkhead assembly 140, a second end 180B coupled with radial port 166 of the tee 164 of annulus conduit 160, a central bore 182 extending between ends 180A and 180B, and a pair of longitudinally spaced crossover valves or selective isolation members 184 (shown as first crossover valve 184A and second crossover valve 184B in FIGS. 2-6). In embodiments, as illustrated in FIGS. 2-6, each crossover valve 184 may include a gate valve actuated between open and closed positions via a manual or mechanical actuator 186 coupled thereto that may be manually actuated by ROV 70 via subsea connector 118; however, in other embodiments, crossover valves 184 may comprise various valves or selective isolation members controlled via hydraulic, electric, or mechanical actuation.

In this arrangement, crossover valves 184 may be opened via actuators 186 to provide fluid communication between tee 164 of annulus conduit 160 and terminating bulkhead assembly 140, and closed to restrict fluid communication between annulus conduit 160 and terminating bulkhead assembly 140. In the illustrated embodiment, the pair of crossover valves 184A and 184B may be used to effect a dual seal barrier between annulus conduit 160 and terminating bulkhead assembly 140 when crossover valves 184A and 184B are actuated into the closed position; however, in other embodiments, crossover conduit 180 may comprise varying numbers of valves or selective isolation members.

Figure 3:
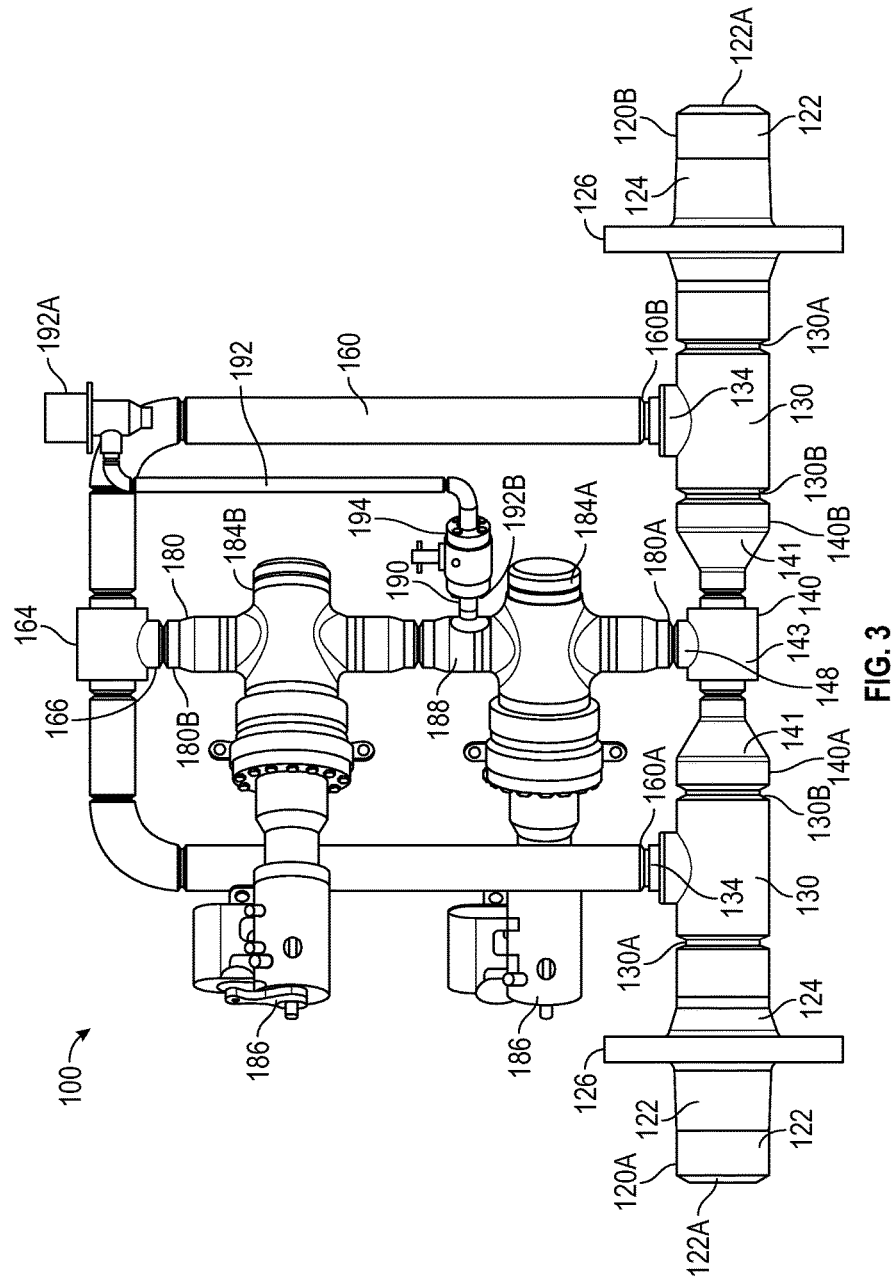
FIG. 3 is a side view of components of the fluid flow control assembly of FIG. 2 in accordance with one or more embodiments of the present disclosure.
Figure 4:
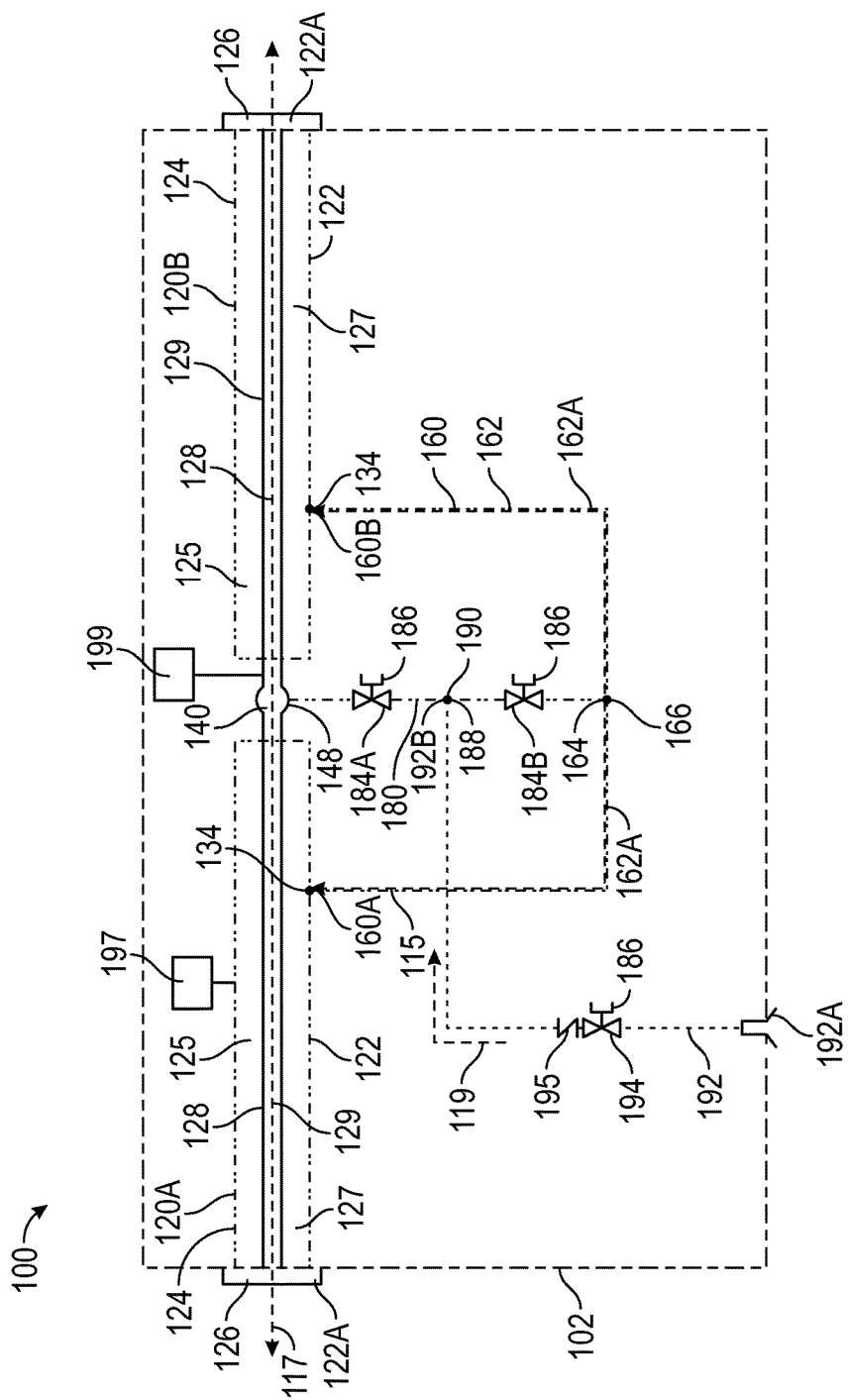
FIG. 4 is a schematic representation of the fluid flow control assembly of FIG. 2 in accordance with one or more embodiments of the present disclosure.

As shown particularly in FIGS. 3 and 4, crossover conduit 180 further may include a tee member 188 disposed between the pair of crossover valves 184A and 184B. Tee member 188 includes a radial port 190 coupled to an injection valve or selective isolation member 194, which is in turn coupled with an external communication conduit 192. Additionally, the external communication conduit 192 may include a check valve 195 (shown in FIG. 4) coupled adjacent injection valve 194. Particularly, external communication conduit 192 includes a first end or port 192A and a second end 192B coupled with injection valve 194. When injection valve 194 is disposed in an open position, check valve 195 is configured to allow for fluid flow from first end 192A to second end 192B while restricting fluid flow from second end 192B to first end 192A. In the embodiment shown in FIG. 4, injection valve 194 comprises a gate valve coupled to a manual or mechanical actuator 186 for controlling the actuation of injection valve 194 between open and closed positions. As shown particularly in FIG. 2, the first end 192A of external communication conduit 192 is positioned in the injection port aperture 116 of the upper support panel 110 of support frame 102 to allow external communication conduit 192 to be connected to a fluid conduit for injecting fluids into flow control assembly 100 from an external fluid source. In some embodiments, ROV 70 may be used to couple a fluid line or conduit to the first end 192A of external communication conduit 192 to provide for such an external fluid connection. Although in the embodiment of FIGS. 2-6 valves 184A, 184B, and 194 are shown as comprising gate valves, in other embodiments, valves 184A, 184B, and 194 may comprise other types of valves known in the art, including ball valves, plug valves, flapper valves, etc. Additionally, although in this embodiment valves 184A, 184B, and 194 comprise manually controlled valves, in other embodiments, valves 184A, 184B, and 194 may be controlled through other mechanisms, such as hydraulically or electrically.

Figure 5:
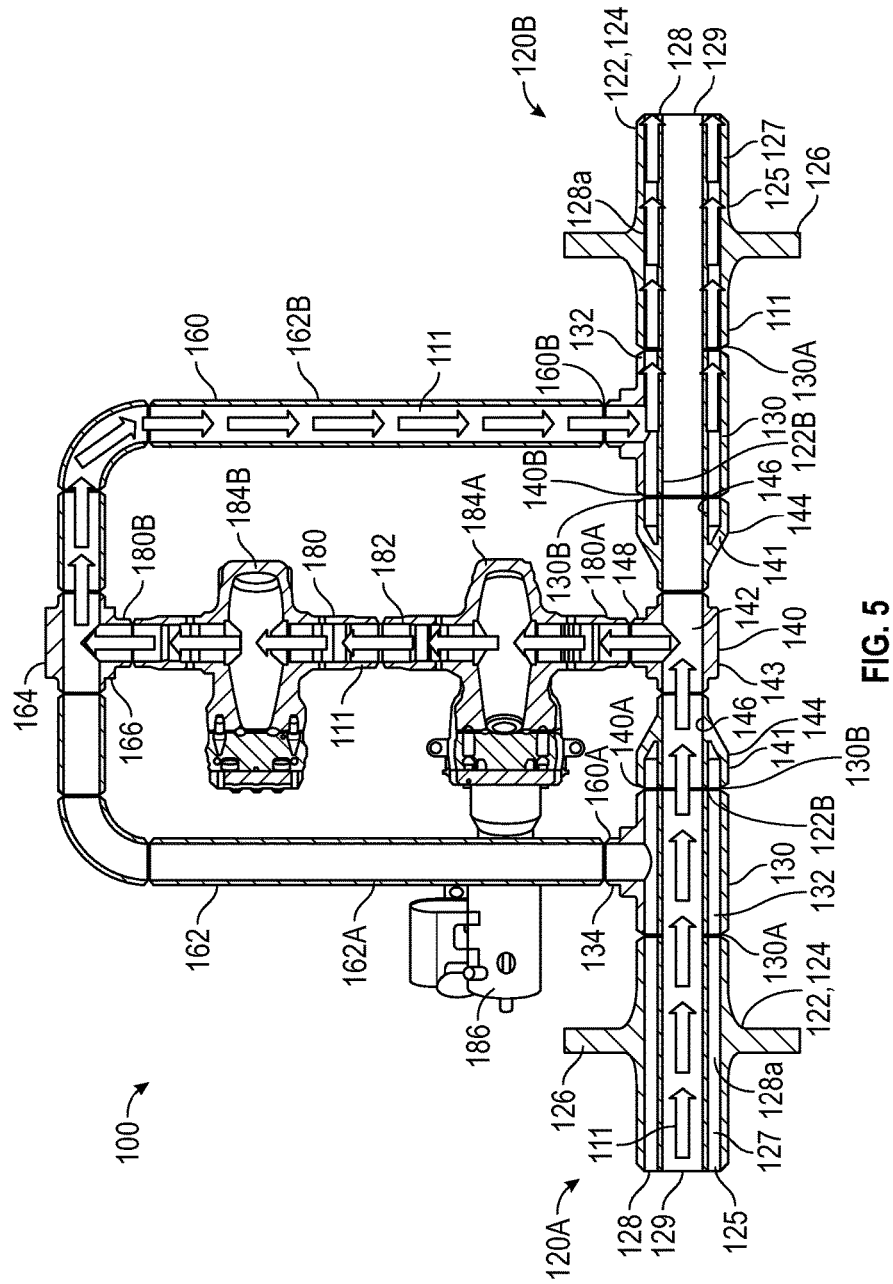
FIG. 5 is a side cross-sectional view of components of the fluid flow control assembly of FIG. 2 illustrating a first fluid flowpath in accordance with one or more embodiments of the present disclosure.
Figure 6:
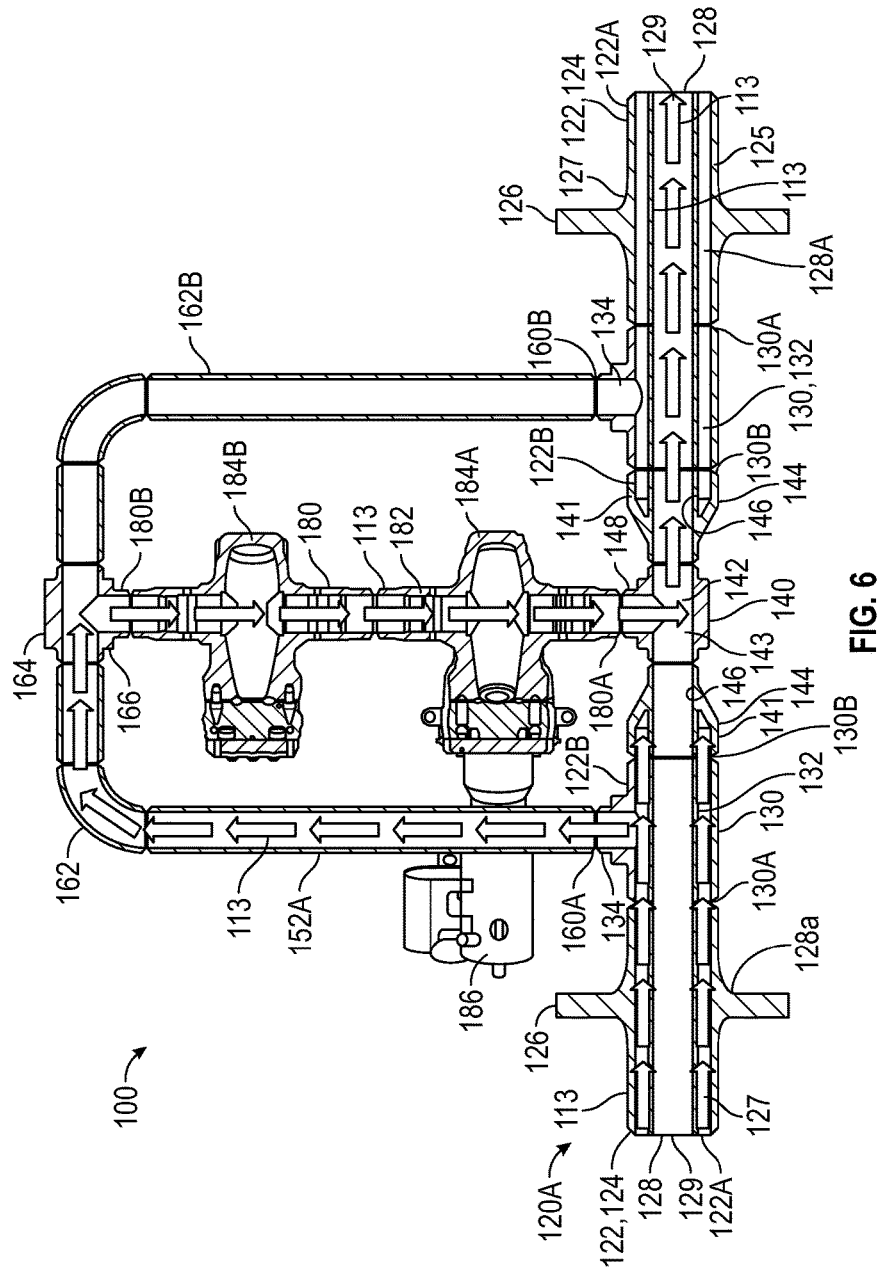
FIG. 6 is a side cross-sectional view of components of the fluid flow control assembly of FIG. 2 illustrating a second fluid flowpath in accordance with one or more embodiments of the present disclosure.

As shown particularly in FIGS. 5 and 6, flow control assembly 100 is configured to provide for both inner bore to annulus fluid flows, annulus to inner bore fluid flows, and external to either annulus or inner bore flows. For instance, FIG. 5 illustrates an inner bore to annulus fluid flowpath (indicated by arrows 111 in FIG. 5) that flows from inner bore 129 of the inner tubular member 128 of pipe-in-pipe assembly 120A, through bore 142 and radial port 148 of terminating bulkhead assembly 140, through bore 182 of crossover conduit 180 (both crossover valves 184 being disposed in the open position), and through radial port 166 of tee 164 and second segment 162B of the bore 162 of annulus conduit 160 into annulus 127 of pipe-in-pipe assembly 120B via radial port 134 of tee 130 of assembly 120B. Further, the direction of fluid flow illustrated by flowpath 111 in FIG. 5 may be reversed such that the fluid flows from inner bore 129 of the inner tubular member 128 of pipe-in-pipe assembly 120B, through radial port 148 of terminating bulkhead assembly 140, through bore 182 of crossover conduit 180 (both crossover valves 184 being disposed in the open position), and through first segment 162A of the bore 162 of annulus conduit 160 into annulus 127 of pipe-in-pipe assembly 120A via radial port 134 of tee 130 of assembly 120A.

Additionally, FIG. 6 illustrates an annulus to inner bore fluid flowpath (indicated by arrows 113 in FIG. 6) that flows from the annulus 127 formed in first pipe-in-pipe assembly 120A, into first segment 162A of the bore 162 of annulus conduit 160 via radial port 134 of the tee 130 of assembly 120A, into and through bore 182 of crossover conduit 180 (both crossover valves 184 being disposed in the open position) via radial port 166 of tee 164, and into the inner bore 129 of inner tubular member 128 of second pipe-in-pipe assembly 120B via radial port 148 and bore 142 of terminating bulkhead assembly 140. In the embodiment of FIG. 6, a portion of the fluid flowing along flowpath 113 through first segment 162A of the bore 162 of annulus conduit 160 may continue through second segment 162B of bore 162 and into annulus 127 of second pipe-in-pipe assembly 120B via radial port 134 in tee 130 of assembly 120B. Alternatively, in some embodiments, a selectively actuated fluid restriction (e.g., a valve, choke, etc.) may be placed in either second segment 162B of bore 162 or in annulus 127 of second pipe-in-pipe assembly 120B (or downstream therefrom) such that the entire fluid flow passing through first segment 162A of bore 162 enters and flows through bore 182 of crossover conduit 180 towards the inner bore 129 of inner tubular member 128 of second pipe-in-pipe assembly 120B. Further, the direction of fluid flow illustrated by flowpath 113 in FIG. 6 may be reversed such that the fluid flows from the annulus 127 formed in second pipe-in-pipe assembly 120B, into second segment 162B of the bore 162 of annulus conduit 160, into and through bore 182 of crossover conduit 180 (both crossover valves 184 being disposed in the open position), and into the inner bore 129 of inner tubular member 128 of first pipe-in-pipe assembly 120A via radial port 148 of terminating bulkhead assembly 140.

As described above, crossover valves 184A and 184B of the crossover conduit 180 of flow control assembly 100 may be actuated between an open position (shown in FIGS. 5 and 6) and a closed position via manual or mechanical actuators 186 operated by ROV 70, for example. When crossover valves 184A and 184B are actuated into the closed position, fluid communication between annulus conduit 160 and terminating bulkhead assembly 140 is restricted via a dual seal barrier provided by the closure of crossover valves 184A and 184B. In this configuration, fluid flowing along an annulus flowpath (indicated by arrow 115 in FIG. 4) through the annulus 127 formed in first pipe-in-pipe assembly 120A flows through annulus conduit 160 via radial port 134 in the tee 130 of assembly 120A, and into annulus 127 formed in second pipe-in-pipe assembly 120B via radial port 134 in the tee 130 of assembly 120B. Additionally, in this configuration, fluid flow along an inner bore flowpath (indicated by arrow 117 in FIG. 4) through inner bore 129 of the inner tubular member 128 of first pipe-in-pipe assembly 120A continues through the bore 142 of terminating bulkhead assembly 140 into inner bore 129 of the inner tubular member 128 of second pipe-in-pipe assembly 120B. The aforementioned fluid flows would follow similar flowpaths with crossover valves 184 closed if the direction of the flows were reversed such that the fluid traveled from second pipe-in-pipe assembly 120B to first pipe-in-pipe assembly 120A. Thus, by actuating crossover valves 184 into the closed position, annular and inner bore fluid flows may be separately maintained through flow control assembly 100.

Moreover, flow control assembly 100 is configured to provide for the injection of fluids into either the annulus 127 or the inner bore 129 of the first pipe-in-pipe assembly 120A and second pipe-in-pipe assembly 120B. For instance, in some embodiments, external fluids such as hydrate inhibitors or other chemicals may be injected into a pipe-in-pipe system (such as production conduit 50 shown in FIG. 1) to remediate or eliminate blockages formed by crystalline hydrates. In other embodiments, the fluid injection functionality provided by flow control assembly 100 may be used to inject other fluids or chemicals into the pipe-in-pipe system. In still other embodiments where external communication conduit 192 does not include check valve 195, external communication conduit 192 of flow control assembly 100 may be used to retrieve samples or divert flow from the pipe-in-pipe system coupled with the assembly 100. As shown particularly in FIGS. 3 and 4, fluid from a fluid source external to flow control assembly 100 may be injected into the first end 192A of external communication conduit 192 with injection valve 194 of conduit 192 disposed in the open position to provide an injection fluid flowpath (indicated by arrow 119 in FIG. 4). In the embodiment shown in FIGS. 2-6, crossover valves 184A and 184B may be selectively actuated to alter the direction of injection flowpath 119 such that injection fluids are supplied to either annulus 127 or inner bore 129 of pipe-in-pipe assemblies 120A and 120B.

Particularly, in an embodiment, first crossover valve 184A is actuated into the closed position while second crossover valve 184B is actuated into the open position, thereby directing injection flowpath 119 into the annulus 127 formed in both first pipe-in-pipe assembly 120A and second pipe-in-pipe assembly 120B while preventing injection fluids from entering the bore 142 of terminating bulkhead assembly 140 or the inner bore 129 of either first assembly 120A or second assembly 120B. In another embodiment, first crossover valve 184A is actuated into the open position while second crossover valve 184B is actuated into the closed position, thereby directing injection flowpath 119 into the bore 142 of terminating bulkhead assembly 140 and inner bore 129 of pipe-in-pipe assemblies 120A and 120B while preventing injection fluids from entering annulus 127 of either assembly 120A or 120B.

In the embodiments of FIGS. 2-6, flow control assembly 100 additionally may include an annulus sensor package 197 and an inner bore sensor package 199, as shown schematically in FIG. 4; however, in other embodiments, flow control assembly 100 need not comprise additional sensors. Annulus sensor package 197 is coupled to at least one of the pipe-in-pipe assemblies 120A and 120B such that annulus sensor package 197 is disposed in fluid communication with the annulus 127 formed in the assembly 120A and/or 120B. Inner bore sensor package 199 is coupled to terminating bulkhead assembly 140 such that bore sensor package 199 is disposed in fluid communication with the inner bore 129 of assemblies 120A and/or 120B; however, in other embodiments, inner bore sensor package 199 may be coupled with either of assemblies 120A and/or 120B to place inner bore sensor package 199 in fluid communication with inner bore 129 of assemblies 120A and/or 120B. In this embodiment, annulus sensor package 197 and inner bore sensor package 199 each may comprise pressure, temperature, and/or one or more sensors for measuring the velocity of fluid flow within annulus 127 and the bore 142 of terminating bulkhead assembly 140, respectively. However, in other embodiments, the sensors included in sensor packages 197 and 199 may vary, and could also (or in the alternative) include other devices, such as chokes or other flow control devices for managing fluid flow in both annulus 127 and bore 142 of terminating bulkhead assembly 140. In some embodiments, sensor packages 197 and 199 are placed in signal communication with a subsea control module (SCM) (not shown).

Figure 7:
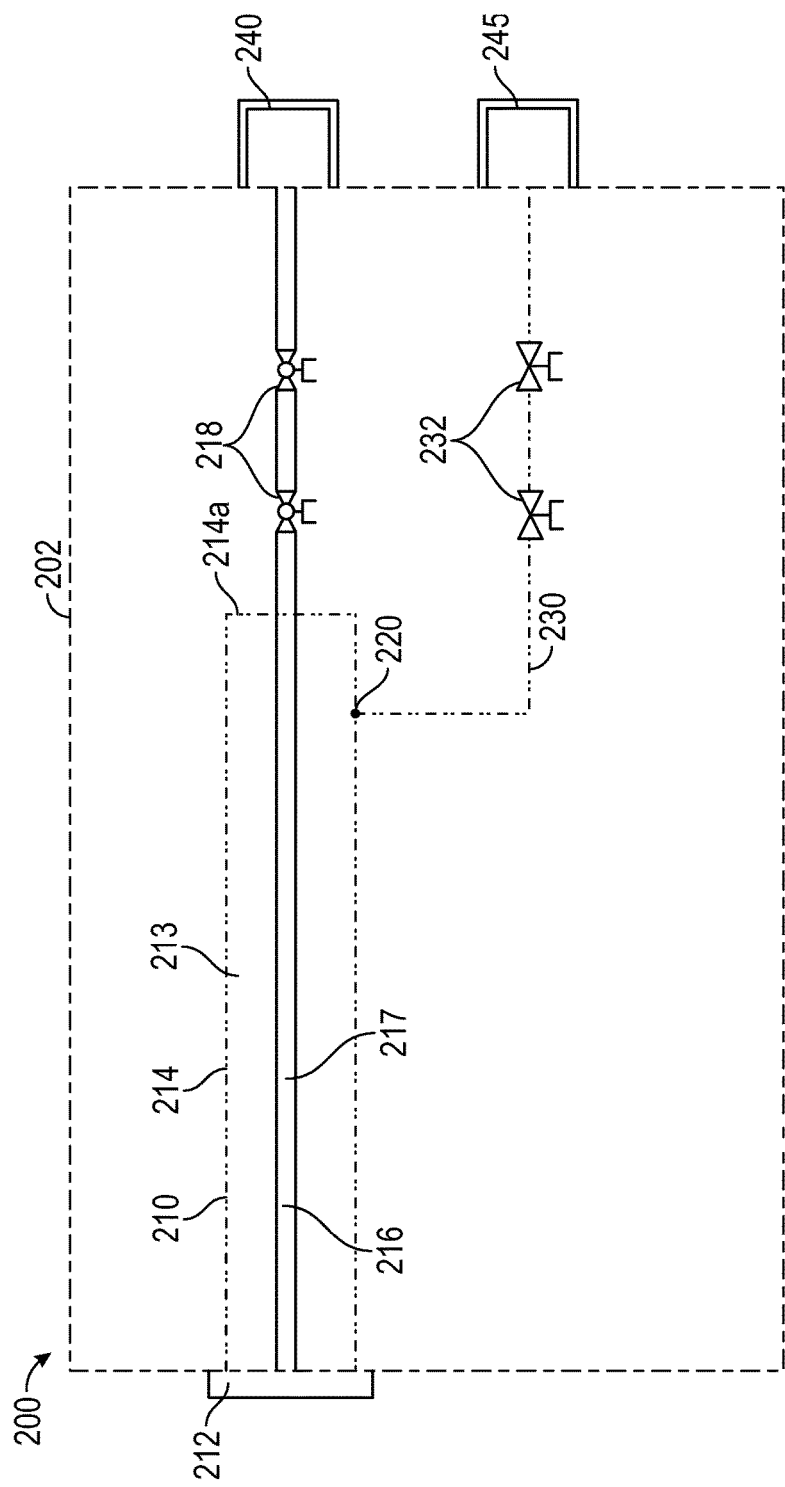
FIG. 7 is a schematic representation of a fluid flow control assembly in accordance with one or more embodiments of the present disclosure.

Referring to FIG. 7, another embodiment of a fluid flow control assembly 200 is shown schematically. In the embodiment shown in FIG. 7, flow control assembly 200 generally includes a support frame 202, a pipe-in-pipe assembly 210, an annulus fluid conduit 230, an inner bore connector 240, and an annulus connector 245. Support frame 202 is configured to absorb loads transmitted to flow control assembly 200, such as pipe-in-pipe assembly 210, from a pipe-in-pipe system coupled therewith, such as the production conduit 50 shown in FIG. 1. In some embodiments, support frame 202 is configured similarly as the support frame 102 of the flow control assembly 100 described above.

The pipe-in-pipe assembly 210 of flow control assembly 200 is configured to provide a pipe-in-pipe fluid flow (i.e., a flow surrounding an inner bore flow) and connects with a pipe-in-pipe system at a connector or connecting flange 212 coupled to the support frame 202. In some embodiments, connecting flange 212 is configured similarly as the connecting flange 126 of the pipe-in-pipe assemblies 120A and 120B of flow control assembly 100 described above. In other embodiments, connector 212 may comprise a welded connection or other types of connections known in the art. In the embodiment shown in FIG. 7, pipe-in-pipe assembly 210 generally includes an outer tubular member 214 extending from connecting flange 212 and terminating at a terminal end 214a, and an inner tubular member 216 disposed in outer tubular member 214 and extending between connecting flange 212 and inner bore connector 240, which is coupled to support frame 202. An inner bore 217 is formed within inner tubular member 216 and an annulus 213 is formed radially between an outer surface of inner tubular member 216 and an inner surface of outer tubular member 214, where annulus 213 terminates at the terminal end 214a of outer tubular member 214. Additionally, inner tubular member 216 includes a pair of inner bore valves or selective isolation members 218 disposed in the portion of inner tubular member 216 that extends between the terminal end 214a of outer tubular member 214 and inner bore connector 240, where valves 218 provide selective dual barrier sealing between the portion of inner bore 217 disposed at connecting flange 212 and the portion of bore 217 disposed at connector 240. In the embodiment shown in FIG. 7, each inner bore valve 218 comprises a gate valve actuated between open and closed positions via a manual actuator coupled thereto (e.g., similar to manual actuators 186 described above, etc.); however, in other embodiments, inner bore valves 218 may comprise one or more of various types of valves or selective isolation members (e.g., gate valves, ball valves, plug valves, etc.) controlled via hydraulic, electric, or mechanical actuation.

In the embodiment shown in FIG. 7, outer tubular member 214 includes a radial port 220 for providing fluid communication between annulus 213 and annulus fluid conduit 230, where annulus conduit 230 is in selective fluid communication with annulus connector 245. Particularly, annulus conduit 230 includes a pair of annulus valves or selective isolation members 232 configured to provide a selective dual seal barrier between radial port 220 and annulus connector 245. In the embodiment shown in FIG. 7, each annulus valve 232 comprises a gate valve actuated between open and closed positions via a manual or mechanical actuator coupled thereto (e.g., similar to manual actuators 186 described above, etc.); however, in other embodiments, annulus valves 232 may comprise various valves or selective isolation members controlled via hydraulic, electric, or mechanical actuation. In this arrangement, flow control assembly 200 provides for the separation of an annular fluid flow disposed in annulus 213 into a fluid conduit separate from a fluid conduit in fluid communication with inner bore 217. Thus, a first fluid conduit may be coupled with inner bore connector 240 while a second fluid conduit may be coupled with annulus connector 245 to fully separate an inner bore fluid flow in inner bore 217 and an annular fluid flow disposed in annulus 213.

Figure 8:
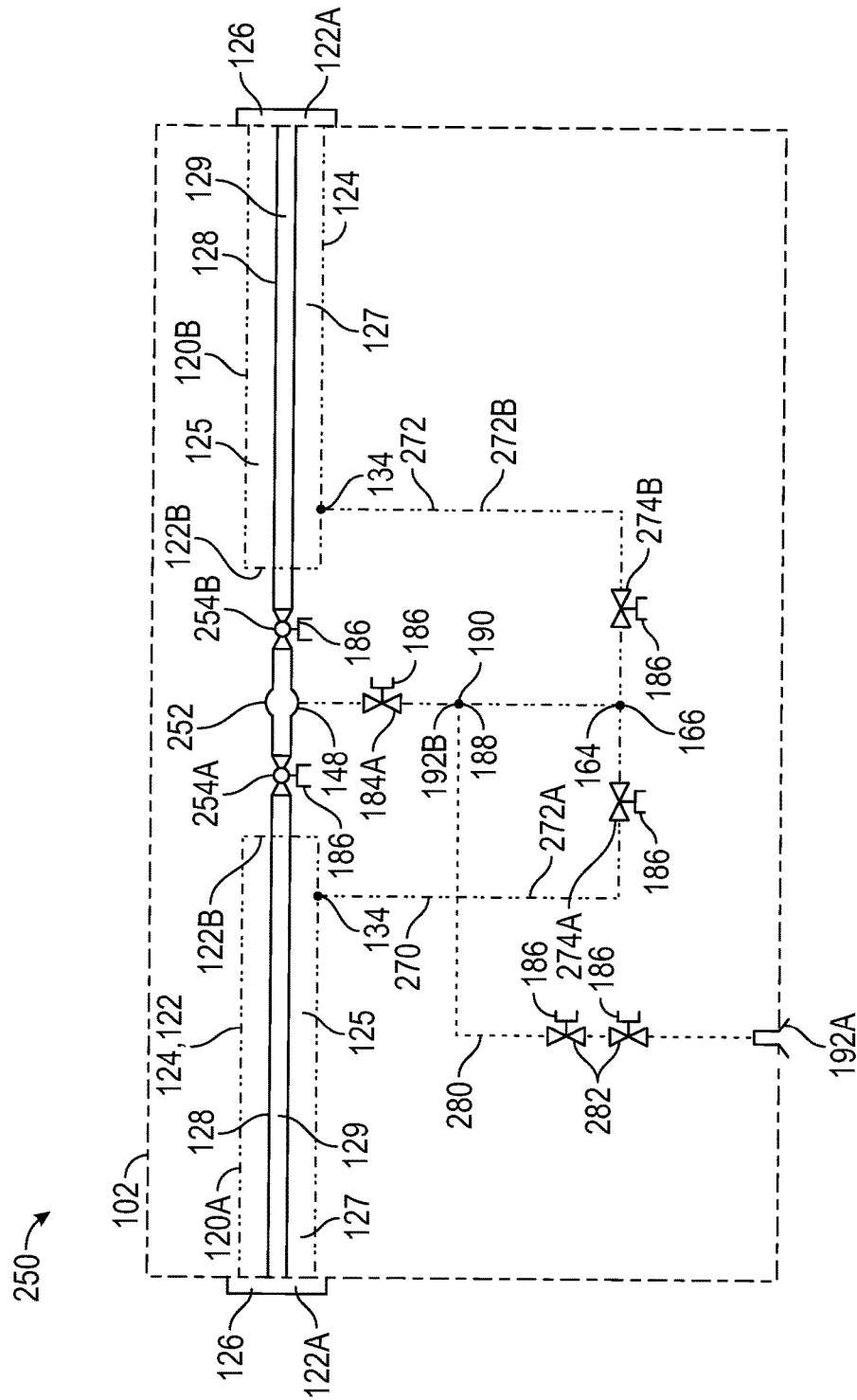
FIG. 8 is a schematic representation of a fluid flow control assembly in accordance with one or more embodiments of the present disclosure.

Referring to FIG. 8, another embodiment of a fluid flow control assembly 250 is shown schematically. Flow control assembly 250 shares features in common with flow control assembly 100 described above and illustrated in FIGS. 2-6, and shared features are labeled similarly. Particularly, flow control assembly 250 includes a terminating bulkhead assembly 252 in lieu of terminating bulkhead assembly 140 of flow control assembly 100 described above. In the embodiment shown in FIG. 8, terminating bulkhead assembly 252 includes, besides the pair of terminating bulkhead members 141 and corresponding bulkhead tee 143, a pair of bulkhead valves or selective isolation members 254, where a first bulkhead valve 254A is disposed between first pipe-in-pipe assembly 120A and radial port 148 of bulkhead assembly 252 and a second bulkhead valve 254B is disposed between port 148 and second pipe-in-pipe assembly 120B. Bulkhead valves 254 comprise manually or mechanically actuated valves in the embodiment shown in FIG. 8, but may comprise electrically, hydraulically, or otherwise actuated valves in other embodiments. In this arrangement, both the inner bore 129 of first pipe-in-pipe assembly 120A and the inner bore 129 of second pipe-in-pipe assembly 120B may be fluidly isolated from the radial port 148 of terminating bulkhead assembly 252 via the actuation of bulkhead valves 254.

Additionally, flow control assembly 250 includes a crossover fluid conduit 260 and an annulus fluid conduit 270. Crossover fluid conduit 260 is configured similarly as the crossover conduit 180 of flow control assembly 100 except that crossover conduit 260 only includes first crossover valve 184A disposed between radial port 148 of terminating bulkhead assembly 252 and the radial port 190 of tee 188 of crossover conduit 260. Annulus conduit 270 of flow control assembly 250 extends between radial ports 134 of pipe-in-pipe assemblies 120A and 120B and includes a central bore 272 extending therebetween. In the embodiment shown in FIG. 8, bore 272 of annulus conduit 270 includes a first segment 272A extending between port 134 of first pipe-in-pipe assembly 120A and the radial port 166 of tee 164 and a second segment 272B extending between radial port 166 and the radial port 134 of second pipe-in-pipe assembly 120B. Further, annulus conduit 270 includes a pair of annulus valves or selective isolation members 274, with a first annulus valve 274A disposed in first segment 272A and a second annulus valve 274B disposed in second segment 272B of bore 272. Annulus valves 274A and 274B comprise manually or mechanically actuated valves in the embodiment shown in FIG. 8, but may comprise electrically, hydraulically, or otherwise actuated valves in other embodiments. Further, flow control assembly 250 includes an injection fluid conduit 280 configured similarly as external communication conduit 192 of flow control assembly 100 but including a pair of injection valves or selective isolation members 282 for forming a dual seal barrier between terminal end 192A and the radial port 190 of tee 188.

The arrangement of flow control assembly 250 shown in FIG. 8 provides for the selective communication of an entire fluid flow within either inner bore 129 of a pipe-in-pipe assembly 120 (e.g., first assembly 120A) with the annulus 127 of the corresponding pipe-in-pipe assembly 120 (e.g., second assembly 120B). For example, by actuating second bulkhead valve 254B and first annulus valve 274A into a closed position, fluid flowing through the inner bore 129 of first pipe-in-pipe assembly 120A may be routed through crossover conduit 260 and the second segment 272B of the bore 272 of annulus conduit 270 into the annulus 127 of second pipe-in-pipe assembly 120B via radial port 134 of second assembly 120B. Further, fluid flow within an inner bore 129 may be sealed and fluid flow in the corresponding annulus 127 may be routed into an adjacent inner bore 129. For example, by actuating first bulkhead valve 254A and second annulus valve 274B into the closed position, fluid flowing in the annulus 127 of first pipe-in-pipe assembly 120A may be routed through the first segment 272A of the bore 272 of annulus conduit 270 and crossover conduit 260 into inner bore 129 of second pipe-in-pipe assembly 120B via radial port 148 of terminating bulkhead 148. Additionally, this embodiment is configured to provide for full isolation of both the production bore and annulus.

Figure 9:
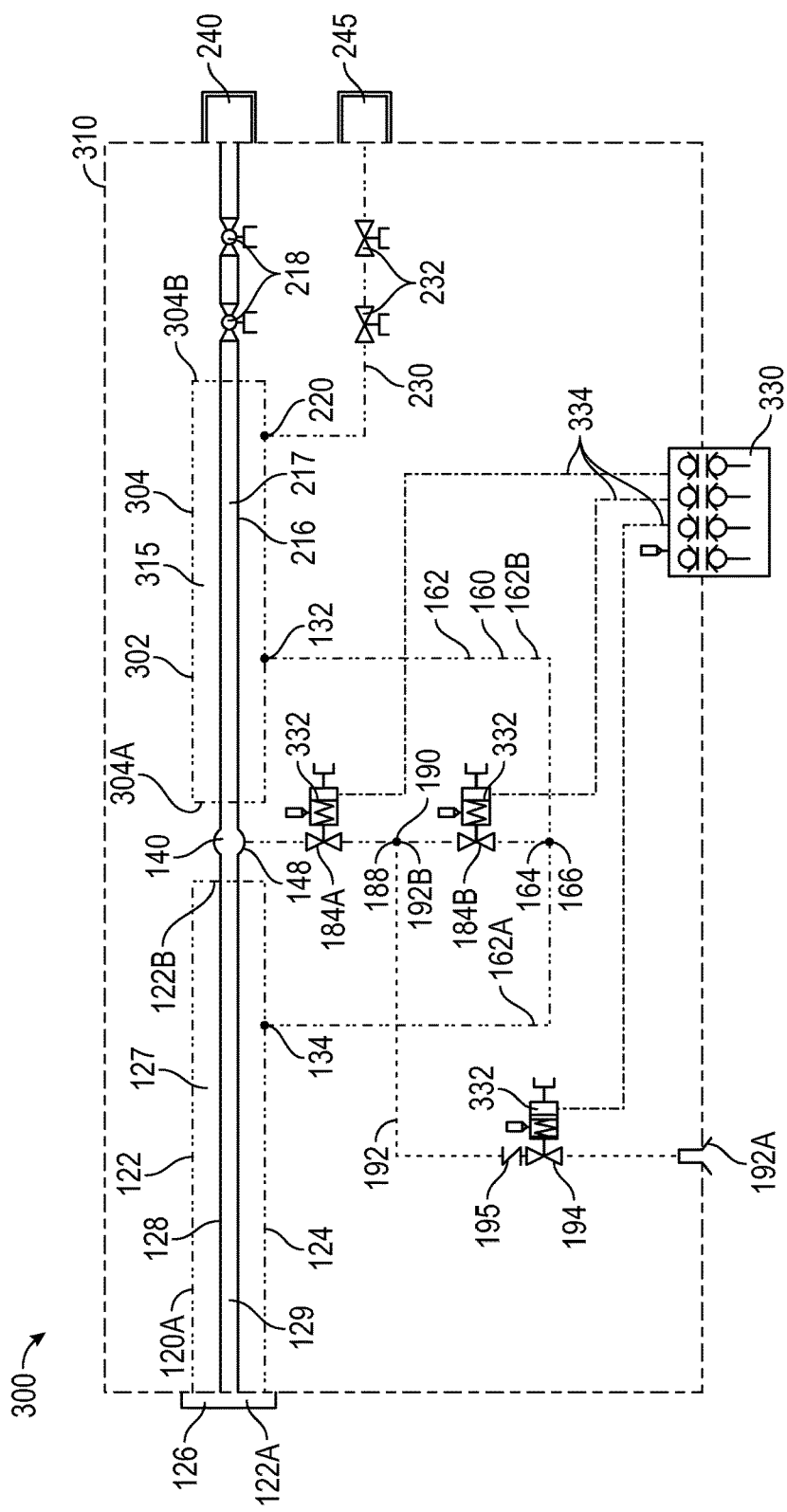
FIG. 9 is a schematic representation of a fluid flow control assembly in accordance with one or more embodiments of the present disclosure.

Referring to FIG. 9, another embodiment of a fluid flow control assembly 300 is shown schematically. Flow control assembly 300 shares features in common with both flow control assembly 100 illustrated in FIGS. 2-6 and flow control assembly 200 illustrated in FIG. 7, and shared features are labeled similarly. Particularly, flow control assembly 300 includes a pipe-in-pipe assembly 302 similar to the pipe-in-pipe assembly 210 of flow control assembly 200 except pipe-in-pipe assembly 302 does not couple directly with a support frame 310 of assembly 300, and instead, couples with terminating bulkhead assembly 140. In the embodiment shown in FIG. 9, pipe-in-pipe assembly 302 generally includes an outer tubular member 304 extending between a first end 304A and a second end 304B, and inner tubular member 216. The first end 304A of outer tubular member 304 couples with terminating bulkhead assembly 140 while second end 304B is spaced from inner bore connector 240. Outer tubular member 304 also includes a radial port 312 for providing fluid communication between an annulus 315 formed between inner tubular member 216 and outer tubular member 304 and the bore 162 of annulus conduit 160. In this arrangement, fluid communication is provided between the bore 217 of inner tubular member 216 and the bore 129 of inner tubular member 128 of first pipe-in-pipe assembly 120A, while fluid communication is provided between annulus 127 of assembly 120A and the annulus 315 of pipe-in-pipe assembly 302 via annulus conduit 160.

In the embodiment shown in FIG. 9, flow control assembly 300 includes a subsea connector 330 in lieu of the subsea connector 118 of flow control assembly 100 shown in FIGS. 2-6. In this embodiment, subsea connector 330 is configured to provide for a fluid connection between ROV 70 and components of flow control assembly 300. In this embodiment, subsea connector 330 comprises a hot stab connector 330. In some embodiments, subsea connector 330 may provide an electrical interface for communicating electric signals and/or power to components of flow control assembly 300. Additionally, crossover valves 184A and 184B and injection valve 194 are each coupled to a corresponding hydraulic actuator 332 in fluid communication with subsea connector 330 via a plurality of corresponding hydraulic control lines 334. In this arrangement, ROV 70 may selectively actuate valves 184A, 184B, and 190 via selectively applying hydraulic pressure to their corresponding hydraulic actuators 332 via the interface provided by subsea connector 330. Alternatively, valves 184A, 184B, and 190 may be hydraulically actuated from other pressure sources other than the pressure source provided by ROV 70. In still other embodiments, valves 184A, 184B, and 190 of flow control assembly 300 may be actuated mechanically or electrically.

Figure 10A:
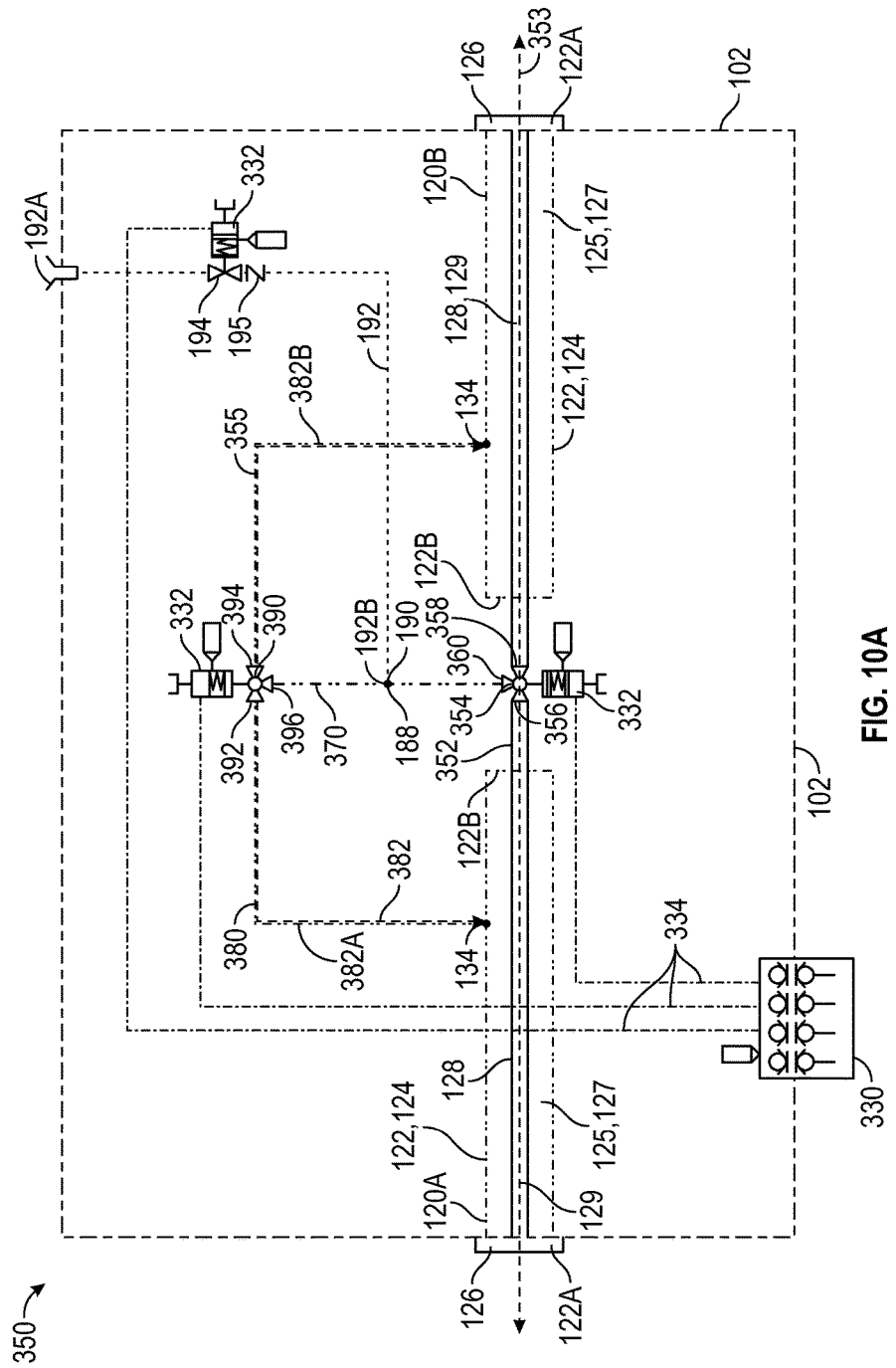
FIG. 10A is a schematic representation of a fluid flow control assembly disposed in a first position in accordance with one or more embodiments of the present disclosure.
Figure 10B:
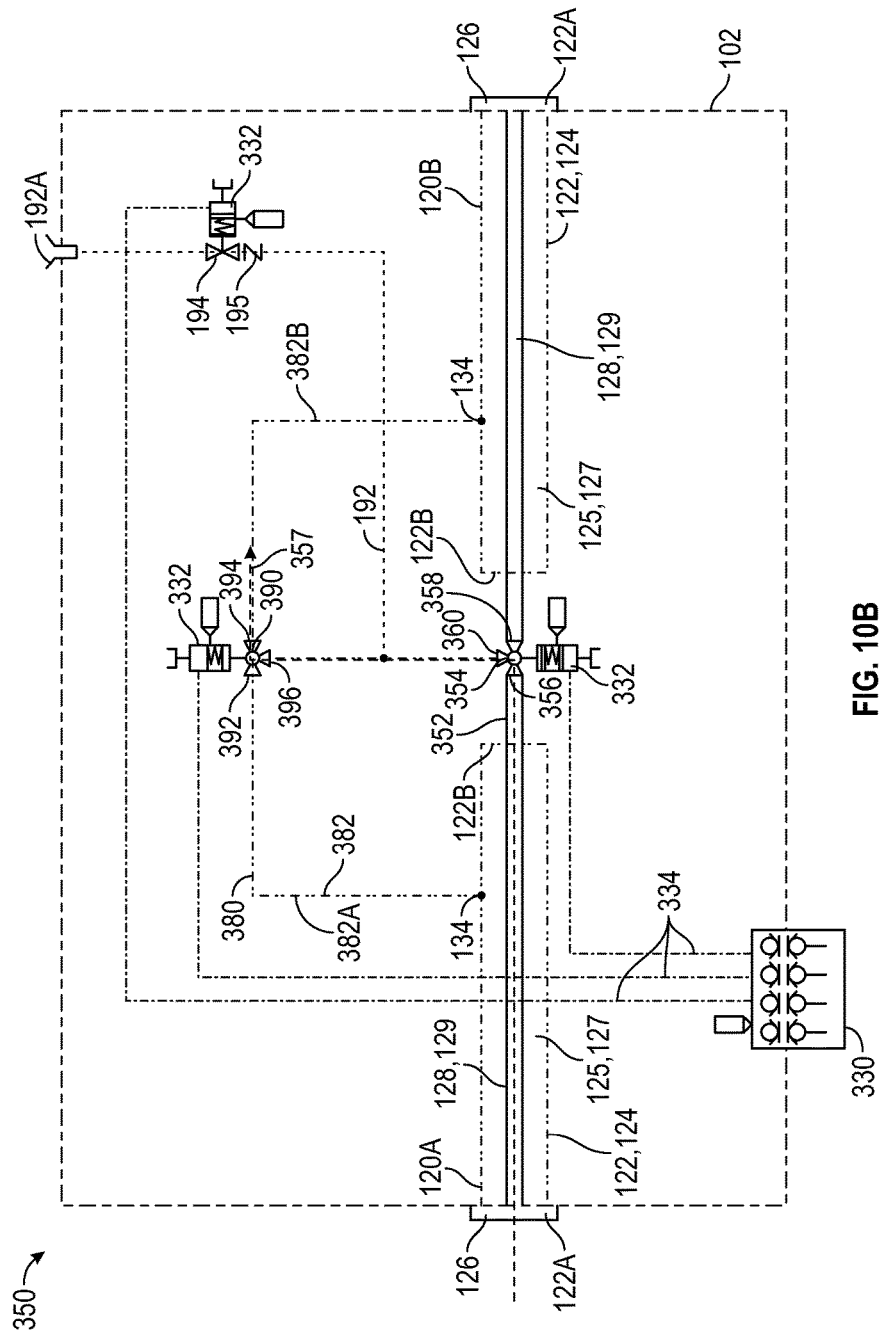
FIG. 10B is a schematic representation of the fluid flow control assembly of FIG. 10A disposed in a second position in accordance with one or more embodiments of the present disclosure.

Referring to FIGS. 10A and 10B, another embodiment of a fluid flow control assembly 350 is shown schematically. Flow control assembly 350 shares features in common with flow control assembly 100 described above and illustrated in FIGS. 2-6 and flow control assembly 300 shown in FIG. 9, and shared features are labeled similarly. Particularly, in lieu of the terminating bulkhead assembly 140 of assembly 100, assembly 350 includes a terminating bulkhead assembly 352 including, besides a pair of terminating bulkhead members 141 and a bulkhead tee 143, a ball valve 354, which may comprise an annular ball valve, for controlling fluid flow between the inner bore 129 of pipe-in-pipe assemblies 120A and 120B and a crossover fluid conduit 370. In the embodiment shown in FIGS. 10A and 10B, ball valve 354 includes a first port 356 in fluid communication with the inner bore 129 of first pipe-in-pipe assembly 120A, a second port 358 in fluid communication with the inner bore 129 of second pipe-in-pipe assembly 120B, and a third port 360 in fluid communication with crossover conduit 370.

Further, annulus conduit 380 of flow control system 350, instead of including tee 164 as with the annulus conduit 160 of flow control assembly 100, includes a ball valve 390 configured to selectively direct fluid flow between the crossover conduit 370 and a first segment 382A of a bore 382 of conduit 380 and a second segment 382B of bore 382. Particularly, ball valve 390 includes a first port 392 in fluid communication with first segment 382A of bore 382, a second port 394 in fluid communication with second segment 382B of bore 382, and a third 396 in fluid communication with crossover conduit 370. In the embodiment shown in FIGS. 10A and 10B, both ball valve 354 and ball valve 390 are each actuated via a corresponding hydraulic actuator 332 connected to subsea connector 330 via control line conduits 334; however, in other embodiments, ball valves 354 and 390 may be actuated via mechanically, electrically, etc., mechanisms.

Ball valves 354 and 390 of flow control assembly 350 each include a first position directing fluid flow in a first direction, and a second position directing fluid flow in a second direction. For example, FIG. 10A shows ball valve 354 of terminating bulkhead assembly 352 disposed in the first position where fluid communication is provided between first port 356 and second port 358 while fluid communication is restricted between ports 356/358 and third port 360. In this arrangement, an inner bore fluid flowpath 353 is formed that extends between the inner bore 129 of first pipe-in-pipe assembly 120A, extending through ball valve 354 via ports 356 and 358, and through inner bore 129 of second pipe-in-pipe assembly 120B. Additionally, FIG. 10A shows ball valve 390 of annulus conduit 380 disposed in the first position, providing fluid communication between ports 394 and 396, while fluid communication is restricted between ports 392/394 and third port 396. In this arrangement, an annulus fluid flow path (indicated by arrow 355 in FIG. 10A) is provided between the annulus 127 of first pipe-in-pipe assembly 120A and the annulus of second pipe-in-pipe assembly 120B.

FIG. 10B illustrates both ball valve 354 of terminating bulkhead assembly 352 and ball valve 390 of annulus conduit 380 in the second position. In the configuration of flow control assembly 350 shown in FIG. 10B, fluid communication is provided between first port 356 and third port 360 of terminating bulkhead assembly 352, while fluid communication is restricted between ports 356/360 and second port 380 of the ball valve 354. Additionally, fluid communication is provided between third port 396 and second port 394 of the ball valve 390 of annulus conduit 380, while fluid communication is restricted between ports 394/396 and first port 392. In this arrangement, a crossover fluid flowpath (indicated by arrow 357 in FIG. 10B) is established between the inner bore 129 of first pipe-in-pipe assembly 120A and the annulus 127 of second pipe-in-pipe assembly 120B. Particularly, fluid flowing through crossover flowpath 357 flows from inner bore 129 of assembly 120 through crossover conduit 370 via first port 356 and third port 360 of ball valve 354, through second segment 382B of the bore 382 of annulus conduit 380 via third port 390 and second port 394 of ball valve 390, and into annulus 127 of second pipe-in-pipe assembly 120B via radial port 134. By reversing the direction of fluid flow while holding ball valves 354 and 390 in the second position, fluid may flow from annulus 127 of second pipe-in-pipe assembly 120B to the inner bore 129 of first pipe-in-pipe assembly 120A.

Figure 11:
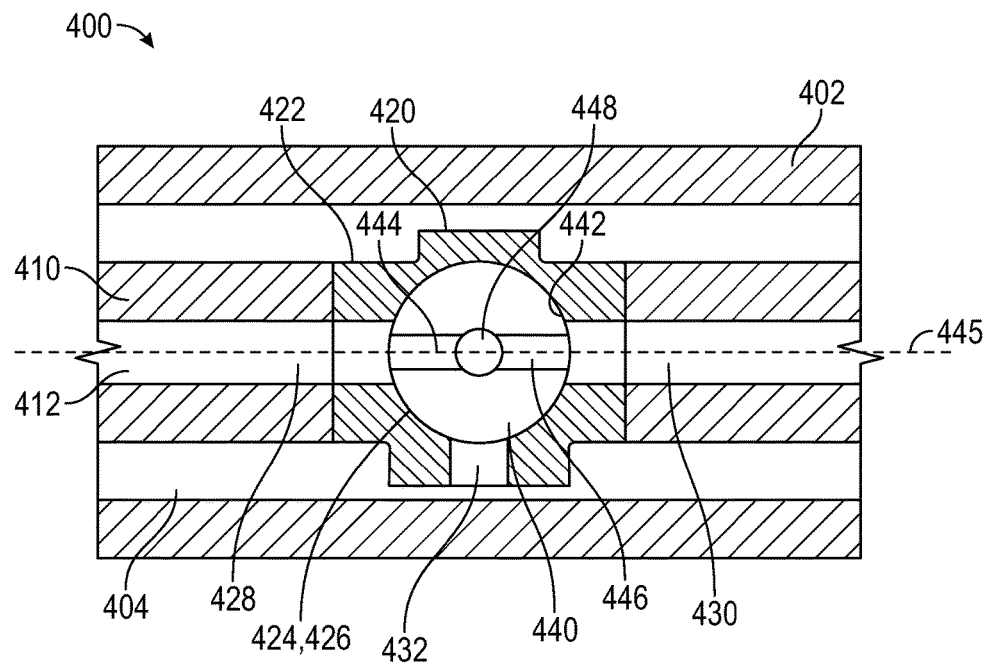
FIG. 11 is a schematic view of a ball valve assembly shown in a first position in accordance with one or more embodiments of the present disclosure.
Figure 12:
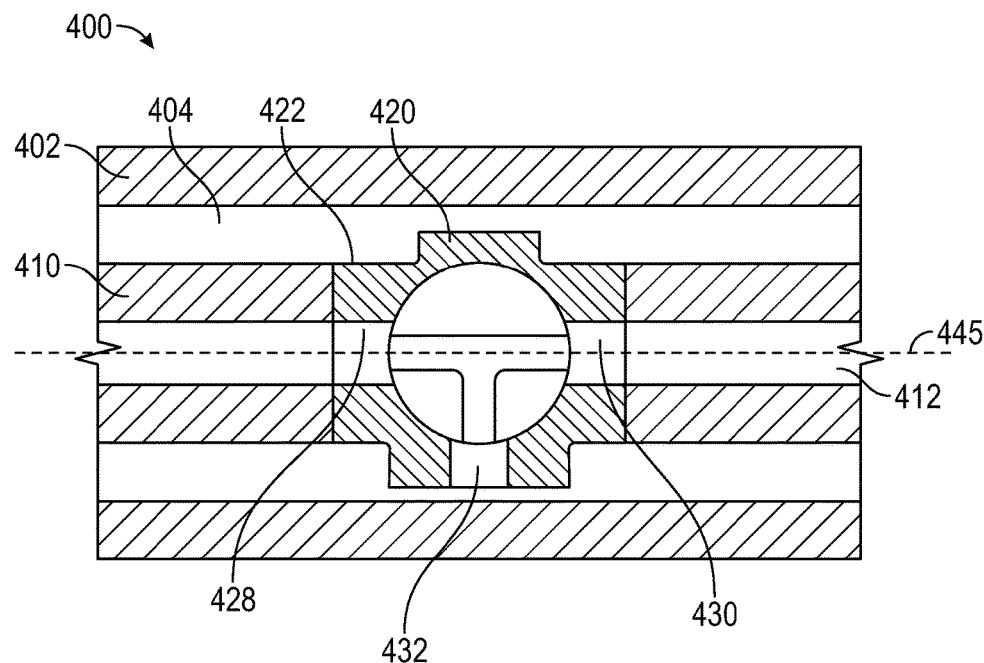
FIG. 12 is a schematic view of the ball valve assembly of FIG. 11 shown in a second position in accordance with one or more embodiments of the present disclosure.

Referring to FIGS. 11 and 12, schematic illustrations of another embodiment of a fluid flow control assembly 400 are shown. As shown in the embodiment of FIGS. 11 and 12, although ball valves 354 and 390 are shown as components of flow control assembly 350, which includes additional components such as crossover conduit 370 and annulus conduit 380, annular ball valves may be incorporated directly into a pipe-in-pipe system for controlling fluid flow between an inner bore and a surrounding annulus without including the additional components of assembly 350. Particularly, flow control assembly 400 includes an outer tubular member 402 and an inner tubular member 410 disposed therein, where inner tubular member 410 includes a central bore 412 and an annulus 404 is formed between an outer surface of inner tubular member 410 and an inner surface of outer tubular member 402. Additionally, flow control assembly 400 includes an annular ball valve 420 coupled to the inner tubular member 410, where ball valve 420 generally includes an outer housing 422 and a ball or spherical member 440 disposed in housing 422.

The outer housing 422 of ball valve 420 includes a central chamber 424 that is defined by an inner surface 426 that is at least partially spherical. Housing 422 also includes a first port 428, a second port 430, and a third port 432, where ports 428, 430, and 432 each extend between an outer surface of housing 422 and chamber 424. First port 428 and second port 430 are each in fluid communication with bore 412 of inner tubular member 410 while third port 432 is in fluid communication with annulus 404. In the embodiment shown in FIGS. 11 and 12, ball 440 has a generally spherical outer surface 442, a first port 444, a second port 446, and a third port 448, where ports 444, 446, and 448 each extend from outer surface 442 and intersect at a center of ball 440 such that ports 444, 446, and 448 are each in fluid communication with each other. First port 428 and second port 430 extend along a common longitudinal axis and provide fluid communication between a portion of the bore 412 of inner tubular member 410 disposed on each side of ball valve 420. In this configuration, ports 444 and 446 comprise an axially extending bore. Third port 448 extends along a longitudinal axis disposed at an angle (orthogonal in the embodiment of FIGS. 11 and 12) relative the axis of ports 444 and 446 and is configured to provide selective fluid communication between bore 412 of inner tubular member 410 and annulus 404. The outer surface 442 of ball 440 is in sealing engagement with seal rings (not shown) disposed in the inner surface 426 of housing 422, forming a metal-to-metal seal to restrict fluid communication therebetween.

Specifically, FIG. 11 illustrates the ball 440 of ball valve 420 of flow control assembly 400 in a first position (third port 448 is shown extending out of the page in FIG. 11) restricting fluid communication between bore 412 of inner tubular member 410 and annulus 404 while FIG. 12 illustrates the ball 440 of ball valve 420 in a second position providing fluid communication between bore 412 and annulus 404. In the embodiment shown in FIGS. 11 and 12, in both the first and second positions of the ball 440 of ball valve 420, fluid communication is provided between first port 444 and second port 446 of ball 440, thereby providing fluid communication between the portions of bore 412 disposed on each side of ball valve 420. Ball valve 420 includes an actuation mechanism for rotating ball 440 about an axis of rotation 445 between the first position shown in FIG. 11 and the second position shown in FIG. 12.

In some embodiments, the actuation mechanism may comprise hydraulic, electric, or mechanical actuators. Ball 440 may be actuated via an ROV disposed proximal flow control assembly 400 or remotely via a SCM. In some embodiments, outer tubular member 402 and inner tubular member 410 comprise tubular members of a pipe-in-pipe system, such as the production conduit 50 shown in FIG. 1; however, in other embodiments, tubular members 402 and 410 may comprise other tubular members used in well systems or other industrial applications. In the manner described above, annular ball valve 420 provides a mechanism for directing bore and annulus crossover fluid flow without needing to actuate a sliding sleeve of a sliding sleeve valve, where sliding sleeves may be more costly or prone to malfunctioning due to the need of sliding the sleeve axially in order to actuate the sliding sleeve valve.

Referring to FIGS. 13-18, another embodiment of a fluid flow control assembly 500 comprising an annular ball valve is shown. In some embodiments, flow control assembly 500 is coupled with or forms a part of a pipe-in-pipe system, such as the production conduit 50 shown in FIG. 1; however, in other embodiments, assembly 500 may be used to control the direction of fluid flow between an inner bore and a surrounding annulus in other fluid systems. In the embodiment shown in FIGS. 13-18, flow control assembly 500 has a central or longitudinal axis 505 and generally includes an outer tubular member 502, an inner tubular member 510, an outer housing or rotation sleeve 520, a ball or spherical member 540, an actuation sleeve or member 560, and a biasing member 580. In some embodiments, actuation sleeve or member 560 comprises a mechanical actuator 560, while in other embodiments, actuation sleeve or member 560 comprises an electric actuator 560.

Inner tubular member 510 of flow control assembly 500 includes a central bore 512 disposed coaxially with central axis 505 and an annulus 504 is formed between an outer surface 514 of inner tubular member 510 and the inner surface of outer tubular member 502. A plurality of axially spaced annular centralizers 506 can be disposed between tubular members 502 and 510 to centralize the position of inner tubular member 510 within outer tubular member 502, where centralizers 506 include ports (not shown) therein for providing fluid communication through annulus 504 across centralizers 506. The outer surface 514 of inner tubular member 510 includes an increased diameter section or valve body 516 that forms a pair of axially spaced shoulders 516s at each end of valve body 516. In some embodiments, valve body 516 is coupled (e.g., welded, etc.) axially to inner tubular member 510. As will be discussed further herein, the outer surface 514 of valve body 516 (valve body 516 sharing outer surface 514 in common with inner tubular member 510) includes a radially extending anti-rotation key 515 for restricting relative rotation between inner tubular member 510 and actuation sleeve 560. Additionally, a generally cylindrical inner surface 513 of valve body 516 (where both valve body 516 and inner tubular member 510 share in common inner surface 513) includes seal rings 517 disposed within corresponding annular slots or receptacles. Further, inner tubular member 510 includes an arcuate slot 518 and a port 519 (shown in FIGS. 15 and 17) each extending radially therethrough at valve body 516. Arcuate slot 518 extends around a portion of the circumference of inner tubular member 510, allowing for limited rotation between ball 540 and inner tubular member 510, as will be discussed further herein.

Rotation sleeve 520 is generally cylindrical and includes a central bore 522 extending between terminal ends thereof. Sleeve 520 includes a radial aperture 524 that receives a connecting pin 526 coupled with ball 540. In other embodiments, actuating sleeve 560 may interface directly with connecting pin 526, eliminating rotation sleeve 520 from the flow control assembly 500. Rotation sleeve 520 is coupled with ball 540 such that rotation of sleeve 520 about central axis 505 results in a corresponding rotation of ball 540 about axis 505. Additionally, rotation sleeve 520 is prevented from moving axially through annulus 504 due to physical engagement between ball 540 and valve body 516. Thus, sleeve 520 is rotatably disposed within annulus 504. In the embodiment shown in FIGS. 13-18, rotation sleeve 520 includes at least one angled slot 528 extending therein from a first or upper end of sleeve 520. Slot 528 extends both axially and arcuately across rotation sleeve 520 and is configured to receive and engage a guide pin 570 of actuation sleeve 560, as will be discussed further herein.

Ball 540 of flow control assembly 500 is generally configured to selectively direct fluid flow between bore 512 and annulus 504. In the embodiment shown in FIGS. 13-18, ball 540 includes a generally spherical outer surface 542, an axial bore 544 and a radial port 546 that orthogonally intersects bore 544. Additionally, ball 540 includes an aperture 548 (e.g., a threaded hole, arcuate slot, etc.) configured to receive connecting pin 526 and thereby rotationally couple ball 540 with rotation sleeve 520. In some embodiments, in lieu of aperture 548, pin 526 may be formed integrally with ball 540. Although aperture 548 is shown as comprising an arcuate slot in FIG. 14, in other embodiments, aperture 548 may comprise a hole (i.e., not an arcuate slot) having various cross-sectional shapes. In the arrangements shown particularly in FIG. 13, bore 544 of ball 540 is aligned or disposed coaxial with central axis 505 of flow control assembly 500 while port 546 is disposed orthogonal central axis 505 (i.e., into the page). Additionally, the outer surface 542 of ball 540 forms a metal-to-metal seal against seal rings 517 disposed in the inner surface 513 of inner tubular member 510, where seal rings 517 are compressed between the ball 540 and inner tubular member 510. Although in this embodiment a metal-to-metal seal is formed between ball 540 and seal rings 517, in other embodiments, one or more seals may be positioned between ball 540 and inner tubular member 510 to provide sealing engagement therebetween.

Actuation sleeve 560 of flow control assembly 500 is disposed in annulus 504 and includes a first end 560A and a second end 560B axially spaced from first end 560A. In the embodiment shown in FIGS. 13-18, the first end 560A of actuation sleeve 560 includes a radially extending flange 562 including a pair of annular seals 564 for sealing against the outer surface 514 of inner tubular member 510 and the inner surface of outer tubular member 502. In the embodiment shown in FIGS. 13-18, an annular flange 508 is disposed proximal the first end 560A of actuation sleeve 560 and extends radially between the outer surface 514 of inner tubular member 510 and the inner surface of outer tubular member 502. In this arrangement, an actuation chamber 566 is disposed in annulus 504 between flange 508 and the seals 564 of actuation sleeve 560. A radial port 507 is disposed in outer tubular member 504 to provide fluid communication between actuation chamber 566 and the surrounding environment. In some embodiments, an electric actuator may be disposed in chamber 566 and port 507 may comprise an electric connection. In other embodiments, various configurations of actuating mechanisms may be provided.

Outer tubular member 502 additionally includes an annular shoulder 509 disposed proximal the first end of rotation sleeve 520, where shoulder 509 extends radially towards the outer surface 514 of inner tubular member 510 from the inner surface of outer tubular member 502. In some embodiments, flow control assembly 500 may not include shoulder 509 in configurations that do not include a biasing member. In the embodiment shown in FIGS. 13-18, actuation sleeve 560 includes an anti-rotation slot 568 that extends axially from second end 560B and receives anti-rotation key 515 of inner tubular member 510. With key 515 received within slot 568 of actuation sleeve 560, actuation sleeve 560 is permitted to slide axially through annulus 504 but is restricted from rotating about central axis 505 relative inner tubular member 510. Actuation sleeve 560 further includes guide pin 570 (shown in FIGS. 16 and 18) extending from an outer surface therefrom and received within the angled slot 528 of rotation sleeve 520. In this arrangement, axial movement of actuation sleeve 560 is translated into rotation of rotation sleeve 520 and ball 540 due to the angled profile of angled slot 528 of rotation sleeve 520. In other words, as actuation sleeve 560 moves axially relative rotation sleeve 520, guide pin 570 slides through angled slot 528, thereby applying a torque to rotation sleeve 520 that causes the rotation of sleeve 520 and the ball 540 coupled thereto.

Biasing member 580 is disposed in annulus 504 and extends between and physically engages flange 564 of actuation sleeve 560 and shoulder 509 of outer tubular member 504. In this arrangement, biasing member 580 axially biases actuation sleeve 560 in the direction of flange 508, as shown particularly in FIG. 13. In the embodiment shown in FIGS. 13-18, biasing member 580 comprises a spring; however, in other embodiments, biasing member 580 may comprise other mechanisms known in the art configured for providing a biasing force. Additionally, in still other embodiments, flow control assembly 500 may not include a biasing member, and instead, actuation mechanisms, such as hydraulic or electric actuators, may be used to control the axial displacement and positioning of actuation sleeve 520 during the operation of flow control assembly 500.

In the embodiment shown in FIGS. 13-18, fluid flow control assembly 500 includes a first position (shown in FIGS. 13, 15, and 16) providing fluid communication through bore 512 across ball 540 via bore 544 while restricting fluid communication between bore 512 and annulus 504, and a second position (shown in FIGS. 17 and 18) where fluid communication is provided both through bore 512 across ball 540 via bore 544 and between bore 512 and annulus 504 via port 546 of ball 540. Particularly, in the first position shown in FIGS. 13, 15, and 16, actuation sleeve 520 is disposed proximal flange 508 and port 546 of ball 540 is angularly or arcuately spaced from port 519 of inner tubular member 510 (shown particularly in FIG. 15) such that fluid communication is restricted between port 546 of ball 540 and port 519 of inner tubular member 510 via the sealing engagement provided between inner surface 513 of inner tubular member 510 and the outer surface 542 of ball 540. Biasing member 580 provides a biasing force against actuation sleeve 560 to retain fluid flow control assembly 500 in the first position restricting fluid flow between bore 512 and annulus 504. In other embodiments, biasing member 580 may be positioned and configured to retain flow control assembly 500 in the second position.

To actuate flow control assembly 500 from the first position shown in FIGS. 13, 15, and 16 to the second position shown in FIGS. 17 and 18, actuation chamber 566 is pressurized to provide a pressure force against actuation sleeve 560 in a direction opposed to the biasing force applied against sleeve 560 by biasing member 580. In this embodiment, an ROV, such as ROV 70 shown in FIG. 1, couples a fluid conduit to port 507 to supply chamber 566 with pressurized fluid; however, in other embodiments, hydraulic pressure may be supplied to chamber 566 from other sources. Additionally, in still other embodiments, assembly 500 may be actuated from the first position to the second position via mechanical (e.g., the application of a mechanical force) or electric actuation.

In response to pressurizing actuation chamber 566, actuation sleeve 560 is displaced axially through annulus 504 towards rotation sleeve 520, thereby compressing biasing member 580. As actuation sleeve 560 travels axially relative rotation sleeve 520, guide pin 570 travels through angled slot 528 and engages the walls of angled slot 528 due to the angled profile of slot 528. Given that actuation sleeve 560 is prevented from rotating relative inner tubular member 510 by anti-rotation key 515, engagement between guide pin 570 and angled slot 528 results in rotation of rotation sleeve 520 about central axis 505. Further, ball 540 rotates in concert with rotation sleeve 520 until port 546 of ball 540 angularly or arcuately aligns with port 519 of inner tubular member 510, as shown particularly in FIG. 17, placing flow control assembly 500 into the second position. Upon the release or venting of fluid pressure within actuation chamber 566, biasing member 580 actuates or displaces actuation sleeve 520 axially towards flange 508, thereby resetting assembly 500 to the first position.

Referring to FIG. 19, an embodiment of a well system 600 is shown schematically. In the embodiment shown in FIG. 19, well system 600 generally comprises a drilling and/or production well system including a wellbore 602 extending from a surface 604 into a subterranean earthen formation 606. Well system 600 additionally includes a wellhead 608 disposed at surface 604 and a tubular string 610 extending into wellbore 602 from wellhead 608. In some embodiments, string 610 comprises a drill string including a drill bit (not shown) disposed at a terminal end thereof for drilling into formation 606. In other embodiments, string 610 comprises a production string or tubing for receiving hydrocarbons produced from formation 606. In still other embodiments, string 610 may comprise a coiled tubing string for intervening in wellbore 602.

In the embodiment shown in FIG. 19, string 610 includes a fluid flow control assembly 612 for selectively controlling fluid communication between a bore 614 of string 610 and an annulus 616 formed between an outer surface of string 610 and an inner surface of wellbore 602. In this embodiment, flow control assembly 612 comprises an annular ball valve similar in configuration to the annular ball valves described with respect to flow control assemblies 400 and 500. Particularly, assembly 612 comprises a first position restricting fluid communication between bore 614 and annulus 616, and a second position providing fluid communication between bore 614 and annulus 616. In the manner shown in FIG. 19, an annular ball valve is used to control fluid communication between an inner bore and a surrounding annulus in a wellbore instead of as part of a pipe-in-pipe system.

An embodiment of a fluid flow control assembly comprises a first pipe-in-pipe assembly comprising an inner tubular member disposed in an outer tubular member, wherein the inner tubular member comprises an inner bore and an annulus is formed between the inner tubular member and the outer tubular member, a terminating bulkhead assembly coupled to the first pipe-in-pipe assembly, wherein fluid communication is provided between a bore of the bulkhead assembly and the inner bore of the inner tubular member while fluid communication is restricted between the bore of the bulkhead assembly and the annulus of the first pipe-in-pipe assembly, and an annulus conduit coupled to a radial port of the first pipe-in-pipe assembly, wherein fluid communication is provided between the annulus conduit and the annulus of the first pipe-in-pipe assembly while fluid communication is restricted between the annulus conduit and the inner bore of the inner tubular member. In some embodiments, the fluid flow control assembly further comprises a second pipe-in-pipe assembly coupled to the terminating bulkhead assembly, wherein the second pipe-in-pipe assembly comprises an inner tubular member disposed in an outer tubular member, and wherein the inner tubular member comprises an inner bore and an annulus is formed between the inner tubular member and the outer tubular member, wherein the annulus conduit is coupled to a radial port of the second pipe-in-pipe assembly to provide fluid communication between the annulus conduit and the annulus of the second pipe-in-pipe assembly. In some embodiments, the fluid flow control assembly further comprises a crossover conduit coupled to the annulus conduit and terminating bulkhead assembly, and a crossover valve coupled to the crossover conduit, wherein the crossover valve is configured to provide selective fluid communication between the bore of the terminating bulkhead assembly and the annulus conduit. In certain embodiments, when the crossover valve is disposed in an open position, a crossover fluid flowpath is established between the inner bore of the first pipe-in-pipe assembly and the annulus of the second pipe-in-pipe assembly. In certain embodiments, when the crossover valve is disposed in a closed position, fluid communication between the inner bore of the first pipe-in-pipe assembly and the annulus of the second pipe-in-pipe assembly is restricted. In some embodiments, the fluid flow control assembly further comprises a hydraulic actuator configured to actuate the crossover valve between an open position and a closed position, and a subsea connector coupled to the hydraulic actuator, wherein the subsea connector is configured to receive pressurized fluids to energize the hydraulic actuator. In some embodiments, the fluid flow control assembly further comprises an injection conduit coupled to the crossover conduit, and wherein the injection conduit is configured to receive fluids from an external subsea source for injection into the terminating bulkhead assembly. In certain embodiments, the fluid flow control assembly further comprises an inner bore connector coupled to the inner tubular member of the first pipe-in-pipe assembly, wherein the inner bore connector is configured to couple with a first fluid conduit for providing fluid communication between the inner bore of the first pipe-in-pipe assembly and the first fluid conduit, and an annulus connector coupled to the annulus conduit, wherein the annulus connector is configured to couple with a second fluid conduit for providing fluid communication between the annulus of the first pipe-in-pipe assembly and the second fluid conduit.

An embodiment of a fluid flow control assembly comprises a first pipe-in-pipe assembly comprising an inner tubular member disposed in an outer tubular member, wherein the inner tubular member comprises an inner bore and an annulus is formed between the inner tubular member and the outer tubular member, an annulus conduit coupled to a radial port of the first pipe-in-pipe assembly, wherein fluid communication is provided between the annulus conduit and the annulus of the first pipe-in-pipe assembly while fluid communication is restricted between the annulus conduit and the inner bore of the inner tubular member, a crossover conduit coupled to the annulus conduit, wherein the crossover conduit is in fluid communication with the inner bore of the inner tubular member, and a crossover valve coupled to the crossover conduit, wherein the crossover valve is configured to provide selective fluid communication between the annulus conduit and the inner bore of the inner tubular member. In some embodiments, the fluid flow control assembly further comprises a support frame, wherein the first pipe-in-pipe assembly comprises an anchor flange coupled to the support frame and configured to transmit loads applied to the first pipe-in-pipe assembly from a pipe-in-pipe system coupled therewith to the support frame. In some embodiments, the fluid flow control assembly further comprises a second pipe-in-pipe assembly coupled to the first pipe-in-pipe assembly, wherein the second pipe-in-pipe assembly comprises an inner tubular member disposed in an outer tubular member, and wherein the inner tubular member comprises an inner bore and an annulus is formed between the inner tubular member and the outer tubular member. In certain embodiments, the fluid flow control assembly further comprises a first ball valve coupled between the crossover conduit, the first pipe-in-pipe assembly, and the second pipe-in-pipe assembly, wherein the first ball valve comprises a first position restricting fluid communication between the inner bore of both the first and second pipe-in-pipe assemblies and the crossover conduit, and a second position providing fluid communication between the inner bore of both the first and second pipe-in-pipe assemblies and the crossover conduit. In certain embodiments, fluid communication is provided between the inner bore of the first pipe-in-pipe assembly and the inner bore of the second pipe-in-pipe assembly when the ball valve is disposed in either the first or second positions. In some embodiments, an annulus conduit is coupled to a radial port of the second pipe-in-pipe assembly, and the crossover valve comprises a second ball valve coupled to the crossover conduit and the annulus conduit, wherein the second ball valve comprises a first position providing fluid communication between the annulus of the first pipe-in-pipe assembly and the annulus of the second pipe-in-pipe assembly while restricting fluid communication between the crossover conduit and the annulus conduit, wherein the second ball valve comprises a second position providing fluid communication between the annulus conduit and the crossover conduit while restricting fluid communication between the annulus of the first pipe-in-pipe assembly and the annulus of the second pipe-in-pipe assembly. In certain embodiments, the first ball valve comprises an outer housing and a ball disposed in the outer housing, and wherein the ball comprises a spherical outer surface sealingly engaging an inner surface of the outer housing. In certain embodiments, the fluid flow control assembly further comprises an inner bore sensor package in fluid communication with the inner bore of the first pipe-in-pipe assembly and configured to measure properties of fluid disposed in the inner bore, and an annulus sensor package in fluid communication with the annulus of the first pipe-in-pipe assembly and configured to measure properties of fluid disposed in the annulus.

An embodiment of a fluid flow control assembly comprises an inner tubular member comprising an inner bore, and a ball valve coupled to the inner tubular member, wherein the ball valve comprises: a housing coupled to the inner tubular member, and a ball rotatably disposed in the housing and comprising an outer surface in sealing engagement with an inner surface of the housing, a bore extending through the ball, and a port that extends at an angle from the bore, wherein the ball valve comprises a first position providing fluid communication through the inner bore across the ball valve while restricting fluid communication between the inner bore and the surrounding environment, and a second position providing fluid communication both through the inner bore across the ball valve and between the inner bore and the surrounding environment. In some embodiments, the inner tubular member comprises a tubular string suspended in a wellbore, and the surrounding environment comprises an annulus disposed between the tubular string and an inner surface of the wellbore. In certain embodiments, the port of the ball extends orthogonally from the bore of the ball. In certain embodiments, the fluid flow control assembly further comprises an actuation sleeve slidably disposed about the inner tubular member, wherein the outer housing comprises a rotation sleeve coupled to the ball and the actuation sleeve, wherein, in response to relative axial movement between the actuation sleeve and the rotation sleeve, the rotation sleeve is configured to rotate the ball and actuate the ball valve between the first position and the second position. In some embodiments, the fluid flow control assembly further comprises a biasing member physically engaging the actuation sleeve, wherein the biasing member is configured to bias the ball valve into the first position. In some embodiments, the rotation sleeve comprises an angled slot, and the actuation sleeve comprises a guide pin received in the angled slot of the rotation sleeve, wherein, in response to relative axial movement between the actuation sleeve and the rotation sleeve, the guide pin is configured to exert a torque on the rotation sleeve to rotate the rotation sleeve. In certain embodiments, the fluid flow control assembly further comprises an outer tubular member comprising a port, wherein the inner tubular member is disposed in the outer tubular member, and an actuation chamber disposed between the inner tubular member and the outer tubular member and in fluid communication with the port of the outer tubular member, wherein, in response to pressurizing the actuation chamber, the actuation chamber is configured to apply a pressure force to the actuation sleeve to actuate the ball valve between the first and second positions. In some embodiments, the fluid flow control assembly further comprises an outer tubular member, wherein the inner tubular member is disposed in the outer tubular member, wherein the surrounding environment comprises an annulus formed between the inner tubular member and the outer tubular member. In certain embodiments, the fluid flow control assembly further comprises an electric actuator configured to actuate the ball valve between the first position and the second position.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A fluid flow control assembly, comprising:
a first pipe-in-pipe assembly comprising an inner tubular member disposed in an outer tubular member, wherein the inner tubular member comprises an inner bore and an annulus is formed between the inner tubular member and the outer tubular member;
a terminating bulkhead assembly coupled to the first pipe-in-pipe assembly, wherein fluid communication is provided between a bore of the bulkhead assembly and the inner bore of the inner tubular member while fluid communication is restricted between the bore of the bulkhead assembly and the annulus of the first pipe-in-pipe assembly;
an annulus conduit coupled to a radial port of the first pipe-in-pipe assembly, wherein fluid communication is provided between the annulus conduit and the annulus of the first pipe-in-pipe assembly while fluid communication is restricted between the annulus conduit and the inner bore of the inner tubular member;
a second pipe-in-pipe assembly coupled to the terminating bulkhead assembly, wherein the second pipe-in-pipe assembly comprises an inner tubular member disposed in an outer tubular member, and wherein the inner tubular member of the second pipe-in-pipe assembly comprises an inner bore and an annulus is formed between the inner tubular member of the second pipe-in-pipe assembly and the outer tubular member of the second pipe-in-pipe assembly;
wherein the annulus conduit is coupled to a radial port of the second pipe-in-pipe assembly to provide fluid communication between the annulus conduit and the annulus of the second pipe-in-pipe assembly;
a crossover conduit coupled to the annulus conduit and terminating bulkhead assembly; and
a crossover valve coupled to the crossover conduit, wherein the crossover valve is configured to provide selective fluid communication between the bore of the terminating bulkhead assembly and the annulus conduit.

2. The fluid flow control assembly of claim 1, wherein, when the crossover valve is disposed in an open position, a crossover fluid flowpath is established between the inner bore of the first pipe-in-pipe assembly and the annulus of the second pipe-in-pipe assembly.

3. The fluid flow control assembly of claim 1, wherein, when the crossover valve is disposed in a closed position, fluid communication between the inner bore of the first pipe-in-pipe assembly and the annulus of the second pipe-in-pipe assembly is restricted.

4. The fluid flow control assembly of claim 1, further comprising:
a hydraulic actuator configured to actuate the crossover valve between an open position and a closed position; and
a subsea connector coupled to the hydraulic actuator, wherein the subsea connector is configured to receive pressurized fluids to energize the hydraulic actuator.

5. The fluid flow control assembly of claim 1, further comprising an injection conduit coupled to the crossover conduit, and wherein the injection conduit is configured to receive fluids from an external subsea source for injection into the terminating bulkhead assembly.

6. The fluid flow control assembly of claim 1, further comprising:
an inner bore connector coupled to the inner tubular member of the first pipe-in-pipe assembly, wherein the inner bore connector is configured to couple with a first fluid conduit for providing fluid communication between the inner bore of the first pipe-in-pipe assembly and the first fluid conduit; and
an annulus connector coupled to the annulus conduit, wherein the annulus connector is configured to couple with a second fluid conduit for providing fluid communication between the annulus of the first pipe-in-pipe assembly and the second fluid conduit.

7. A fluid flow control assembly, comprising:
a first pipe-in-pipe assembly comprising an inner tubular member disposed in an outer tubular member, wherein the inner tubular member comprises an inner bore and an annulus is formed between the inner tubular member and the outer tubular member;
an annulus conduit coupled to a radial port of the first pipe-in-pipe assembly, wherein fluid communication is provided between the annulus conduit and the annulus of the first pipe-in-pipe assembly while fluid communication is restricted between the annulus conduit and the inner bore of the inner tubular member;
a terminating bulkhead assembly coupled to the first pipe-in-pipe assembly, wherein fluid communication is provided between a bore of the bulkhead assembly and the inner bore of the inner tubular member while fluid communication is restricted between the bore of the bulkhead assembly and the annulus of the first pipe-in pipe assembly;
a crossover conduit coupled to the annulus conduit, wherein the crossover conduit is in fluid communication with the inner bore of the inner tubular member, and the wherein the crossover conduit comprises a first end coupled to a port of the terminating bulkhead and a second end that is spaced from the terminating bulkhead and coupled to a port of the annulus conduit; and
a crossover valve coupled to the crossover conduit, wherein the crossover valve is configured to provide selective fluid communication between the annulus conduit and the inner bore of the inner tubular member.

8. The fluid flow control assembly of claim 7, further comprising:
a support frame;
wherein the first pipe-in-pipe assembly comprises an anchor flange coupled to the support frame and configured to transmit loads applied to the first pipe-in-pipe assembly from a pipe-in-pipe system coupled therewith to the support frame.

9. The fluid flow control assembly of claim 7, further comprising a second pipe-in-pipe assembly coupled to the first pipe-in-pipe assembly, wherein the second pipe-in-pipe assembly comprises an inner tubular member disposed in an outer tubular member of the second pipe-in-pipe assembly, and wherein the inner tubular member of the second pipe-in-pipe assembly comprises an inner bore and an annulus is formed between the inner tubular member of the second pipe-in-pipe assembly and the outer tubular member of the second pipe-in-pipe assembly.

10. The fluid flow control assembly of claim 9, further comprising:

a first ball valve coupled between the crossover conduit, the first pipe-in-pipe assembly, and the second pipe-in-pipe assembly;

wherein the first ball valve comprises a first position restricting fluid communication between the inner bore of both the first and second pipe-in-pipe assemblies and the crossover conduit, and a second position providing fluid communication between the inner bore of both the first and second pipe-in-pipe assemblies and the crossover conduit.

11. The fluid flow control assembly of claim 10, wherein fluid communication is provided between the inner bore of the first pipe-in-pipe assembly and the inner bore of the second pipe-in-pipe assembly when the ball valve is disposed in either the first or second positions.

12. The fluid flow control assembly of claim 10, wherein:
an annulus conduit is coupled to a radial port of the second pipe-in-pipe assembly; and
the crossover valve comprises a second ball valve coupled to the crossover conduit and the annulus conduit;
wherein the second ball valve comprises a first position providing fluid communication between the annulus of the first pipe-in-pipe assembly and the annulus of the second pipe-in-pipe assembly while restricting fluid communication between the crossover conduit and the annulus conduit;
wherein the second ball valve comprises a second position providing fluid communication between the annulus conduit and the crossover conduit while restricting fluid communication between the annulus of the first pipe-in-pipe assembly and the annulus of the second pipe-in-pipe assembly.

13. The fluid flow control assembly of claim 10, wherein the first ball valve comprises an outer housing and a ball disposed in the outer housing, and wherein the ball comprises a spherical outer surface sealingly engaging an inner surface of the outer housing.

14. The fluid flow control assembly of claim 7, further comprising:
an inner bore sensor package in fluid communication with the inner bore of the first pipe-in-pipe assembly and configured to measure properties of fluid disposed in the inner bore; and
an annulus sensor package in fluid communication with the annulus of the first pipe-in-pipe assembly and configured to measure properties of fluid disposed in the annulus.

15. A fluid flow control assembly, comprising:
an inner tubular member comprising an inner bore; and
a ball valve coupled to the inner tubular member, wherein the ball valve comprises:
a housing coupled to the inner tubular member;
a ball rotatably disposed in the housing and comprising an outer surface in sealing engagement with an inner surface of the housing, a bore extending through the ball, and a port that extends at an angle from the bore;
wherein the ball valve comprises a first position providing fluid communication through the inner bore across the ball valve while restricting fluid communication between the inner bore and the surrounding environment, and a second position providing fluid communication both through the inner bore across the ball valve and between the inner bore and the surrounding environment;
an actuation sleeve slidably disposed about the inner tubular member;
wherein the outer housing comprises a rotation sleeve coupled to the ball and the actuation sleeve;
wherein, in response to relative axial movement between the actuation sleeve and the rotation sleeve, the rotation sleeve is configured to rotate the ball and actuate the ball valve between the first position and the second position;
the rotation sleeve comprises an angled slot; and
the actuation sleeve comprises a guide pin received in the angled slot of the rotation sleeve, wherein, in response to relative axial movement between the actuation sleeve and the rotation sleeve, the guide pin is configured to exert a torque on the rotation sleeve to rotate the rotation sleeve.

16. The fluid flow control assembly of claim 15, wherein:
the inner tubular member comprises a tubular string suspended in a wellbore; and
the surrounding environment comprises an annulus disposed between the tubular string and an inner surface of the wellbore.

17. The fluid flow control assembly of claim 15, wherein the port of the ball extends orthogonally from the bore of the ball.

18. The fluid flow control assembly of claim 15, further comprising a biasing member physically engaging the actuation sleeve, wherein the biasing member is configured to bias the ball valve into the first position.

19. The fluid flow control assembly of claim 15, further comprising:
an outer tubular member comprising a port, wherein the inner tubular member is disposed in the outer tubular member; and
an actuation chamber disposed between the inner tubular member and the outer tubular member and in fluid communication with the port of the outer tubular member;
wherein, in response to pressurizing the actuation chamber, the actuation chamber is configured to apply a pressure force to the actuation sleeve to actuate the ball valve between the first and second positions.

20. The fluid flow control assembly of claim 15, further comprising:
an outer tubular member, wherein the inner tubular member is disposed in the outer tubular member;
wherein the surrounding environment comprises an annulus formed between the inner tubular member and the outer tubular member.

21. The fluid flow control assembly of claim 15, further comprising an electric actuator configured to actuate the ball valve between the first position and the second position.

* * * * *